US012332582B2

(12) United States Patent
Fukuoka et al.

(10) Patent No.: US 12,332,582 B2
(45) Date of Patent: Jun. 17, 2025

(54) CARTRIDGE HAVING ROTATABLE RECEPTION SHUTTER, CARTRIDGE HAVING LEVER FOR OPENING AND CLOSING RECEPTION SHUTTER, AND METHOD OF SUPPLYING TONER

(71) Applicant: BROTHER KOGYO KABUSHIKI KAISHA, Nagoya (JP)

(72) Inventors: Shintaro Fukuoka, Nagoya (JP); Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/480,035

(22) Filed: Oct. 3, 2023

(65) Prior Publication Data

US 2024/0176259 A1 May 30, 2024

(30) Foreign Application Priority Data

Nov. 25, 2022 (JP) ................................ 2022-188708

(51) Int. Cl.
*G03G 15/08* (2006.01)

(52) U.S. Cl.
CPC ..... *G03G 15/0886* (2013.01); *G03G 15/0894* (2013.01); *G03G 2215/0692* (2013.01)

(58) Field of Classification Search
CPC .......... G03G 15/0886; G03G 15/0894; G03G 2215/0692; B65D 7/28; B65D 51/04
USPC .................................... 399/262; 222/DIG. 1
See application file for complete search history.

(56) References Cited

U.S. PATENT DOCUMENTS

| | | | | |
|---|---|---|---|---|
| 9,360,799 B2 * | 6/2016 | Itabashi | ............. | G03G 15/0879 |
| 2008/0170889 A1 * | 7/2008 | Eto | .................... | G03G 15/0877 399/263 |
| 2008/0317511 A1 * | 12/2008 | Mase | .................. | G03G 15/087 399/262 |
| 2009/0097886 A1 * | 4/2009 | Yoshizawa | ......... | G03G 15/0875 399/263 |
| 2016/0313670 A1 * | 10/2016 | Eto | .................... | G03G 15/0875 |
| 2017/0219960 A1 | 8/2017 | Sato | | |
| 2019/0094753 A1 | 3/2019 | Sato | | |

(Continued)

FOREIGN PATENT DOCUMENTS

| | | |
|---|---|---|
| JP | 60-19174 A | 1/1985 |
| JP | 7-333964 A | 12/1995 |

(Continued)

*Primary Examiner* — Robert B Beatty
(74) *Attorney, Agent, or Firm* — Merchant & Gould P.C.

(57) ABSTRACT

A toner housing extends in a first direction. The toner housing stores toner. The toner housing includes a reception portion and a discharge port. The reception portion is located at an end surface of the toner housing at one end in the first direction. The reception portion has a reception port for receiving toner into the toner housing. The discharge port is located between the one end of the toner housing and an other end of the toner housing in the first direction. The discharge port is located on a surface crossing the end surface. The discharge port is for discharging toner in the toner housing. A reception shutter is attached to the reception portion. The reception shutter is movable between a reception shutter closed position at which the reception port is closed and a reception shutter open position at which the reception port is open.

20 Claims, 33 Drawing Sheets

(56) References Cited

U.S. PATENT DOCUMENTS

| | | | | |
|---|---|---|---|---|
| 2022/0155708 | A1 | 5/2022 | Sato et al. | |
| 2023/0017354 | A1 | 1/2023 | Ozaki et al. | |
| 2024/0241465 | A1 * | 7/2024 | Sato | G03G 15/0875 |
| 2024/0241475 | A1 * | 7/2024 | Sato | G03G 21/18 |

FOREIGN PATENT DOCUMENTS

| | | | | | |
|---|---|---|---|---|---|
| JP | 2006-235046 | A | | 9/2006 | |
| JP | 2008-241771 | A | | 10/2008 | |
| JP | 2009-20302 | A | | 1/2009 | |
| JP | 2013137429 | A | * | 7/2013 | G03G 15/0863 |
| JP | 2015-111211 | A | | 6/2015 | |
| JP | 2017-138388 | A | | 8/2017 | |
| JP | 2019-61214 | A | | 4/2019 | |
| JP | 2021-26202 | A | | 2/2021 | |
| JP | 2022-90641 | A | | 6/2022 | |

* cited by examiner

25 / 33

CARTRIDGE HAVING ROTATABLE RECEPTION SHUTTER, CARTRIDGE HAVING LEVER FOR OPENING AND CLOSING RECEPTION SHUTTER, AND METHOD OF SUPPLYING TONER

REFERENCE TO RELATED APPLICATIONS

This application claims priority from Japanese Patent Application No. 2022-188708 filed on Nov. 25, 2022. The entire content of the priority application is incorporated herein by reference.

BACKGROUND ART

An image forming apparatus including a photosensitive drum and a development device is known.

SUMMARY

In an image forming apparatus, a development container can be supplied with toner. Specifically, the development container has a supply port. The supply port receives toner from a toner pouch containing toner to be supplied to the development container.

In the image forming apparatus described above, after toner is supplied to the development container, an agitator extending in the longitudinal direction of the development container is driven to spread the supplied toner over the entire development container.

Thus, there is a problem that it takes time for the supplied toner to spread over the entire development container and a supplying operation of toner takes time.

In view of the foregoing, an example of an object of this disclosure is to provide a cartridge configured to smoothly supply toner and a method of supplying toner.

According to one aspect, this specification discloses a cartridge. The cartridge includes a toner housing and a reception shutter. The toner housing extends in a first direction. The toner housing is configured to store toner. The toner housing includes a reception portion and a discharge port. The reception portion is located at an end surface of the toner housing at one end in the first direction. The reception portion has a reception port for receiving toner into the toner housing. Thus, toner is supplied from the reception portion located on the end surface in the first direction of the toner housing extending in the first direction. Thus, by supplying toner into the toner housing in a state where the one end of the toner housing in the first direction faces upward, the supplied toner is distributed in the first direction by gravity inside the toner housing. Further, by shaking the cartridge in a state where the reception shutter is located at the reception shutter closed position, the toner supplied in the toner housing is made uniform in the first direction. Thus, the toner is smoothly supplied without requiring time for the supplied toner to spread over the entirety of the toner housing. Further, even if there is no member for conveying the supplied toner in the toner housing in the first direction, the supplied toner is distributed over the entirety of the toner housing. The discharge port is located between the one end of the toner housing and an other end of the toner housing in the first direction. The discharge port is located on a surface crossing the end surface. The discharge port is for discharging toner in the toner housing. The reception shutter is attached to the reception portion. The reception shutter is movable between a reception shutter closed position at which the reception port is closed and a reception shutter open position at which the reception port is open. This suppresses the toner moving toward the discharge port when the toner supplied from the reception portion located at the end surface flows in the first direction. As a result, spilling of the supplied toner from the discharge port is suppressed. Thus, toner is supplied smoothly.

According to another aspect, this specification also discloses a method of supplying toner to a cartridge. The method includes: connecting, to a cartridge, a toner container storing toner to be supplied to a toner housing of the cartridge in a state where a reception shutter of the cartridge is located at a reception shutter closed position; moving the reception shutter from the reception shutter closed position to the reception shutter open position in a state where the toner container is connected to the reception portion; and supplying toner in the toner container into the toner housing in a state where the toner container is connected to the reception portion and the reception shutter is located at the reception shutter open position and the toner container is located above the cartridge. Thus, in a state where the toner container is connected to the reception portion, the reception shutter is moved from the reception shutter closed position to the reception shutter open position. Thus, while suppressing spilling of the toner in the toner container, the toner in the toner container is smoothly supplied to the cartridge by using gravity. If the toner container is to be connected to the cartridge in a state where one end of the toner housing faces upward in the first direction, there is a possibility that toner spills out when the toner container is connected to the cartridge. In this regard, the toner container is placed above the cartridge in a state where the toner container is connected to the reception portion and the reception shutter is located at the reception shutter open position. This suppresses spilling of toner when the toner container and the cartridge are connected. Thus, toner is supplied smoothly.

DESCRIPTION

1. Toner Cartridge 1

A toner cartridge 1 as one embodiment of a cartridge of the present disclosure will be described with reference to FIGS. 1 to 7.

Figure 1:
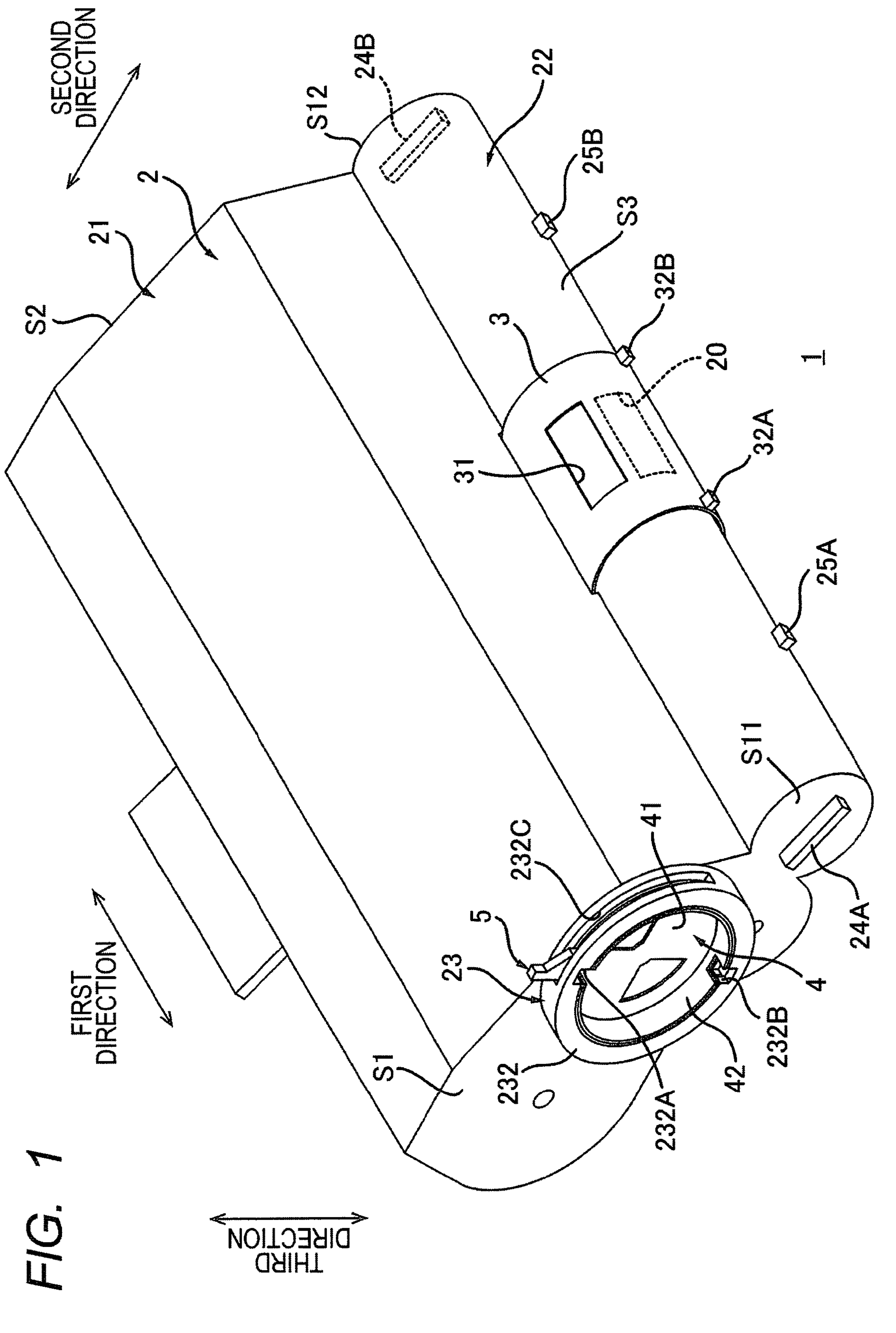
FIG. 1 is a perspective view of a toner cartridge.
Figure 2:
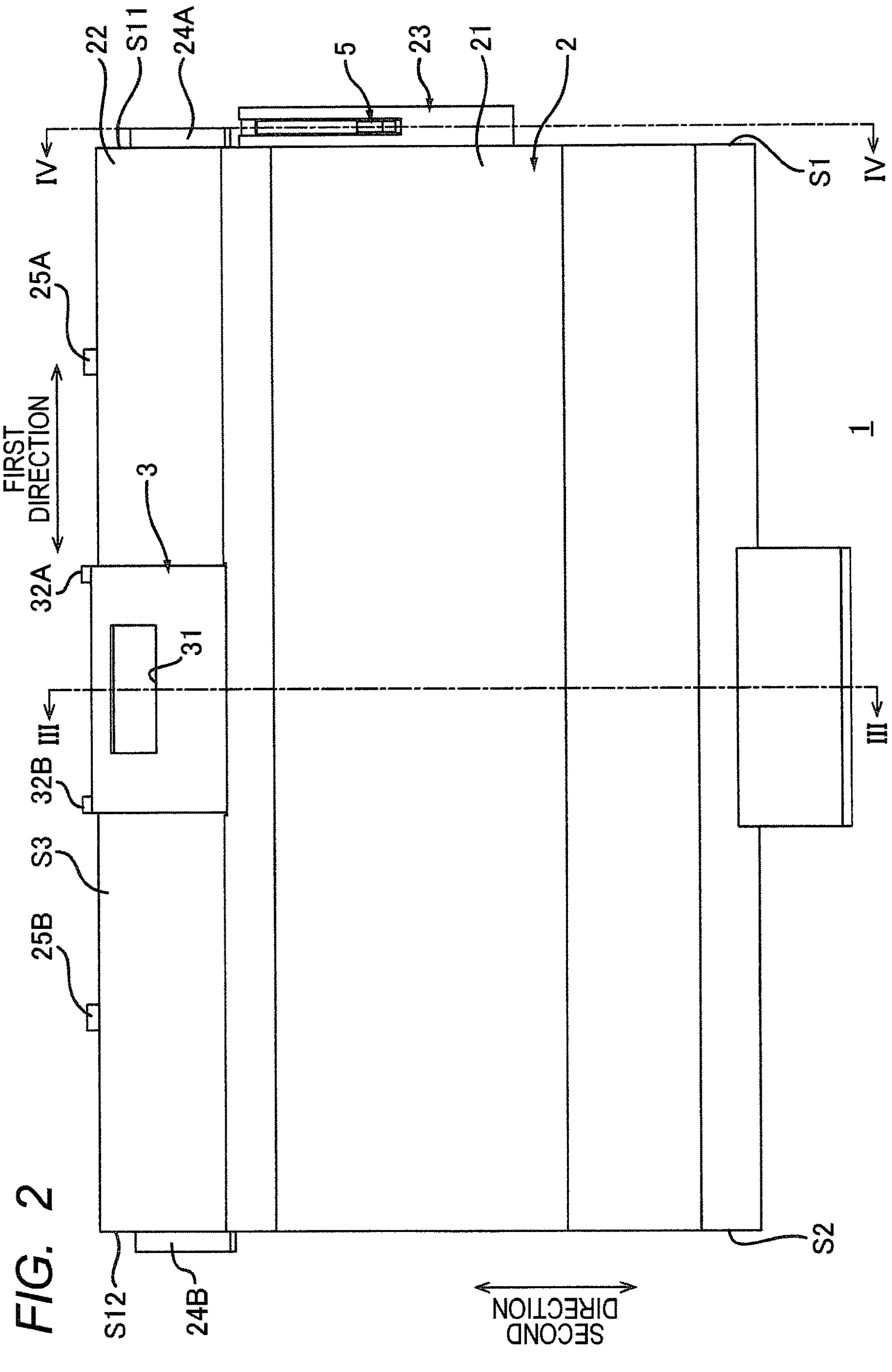
FIG. 2 is a plan view of the toner cartridge shown in FIG. 1
Figure 3:
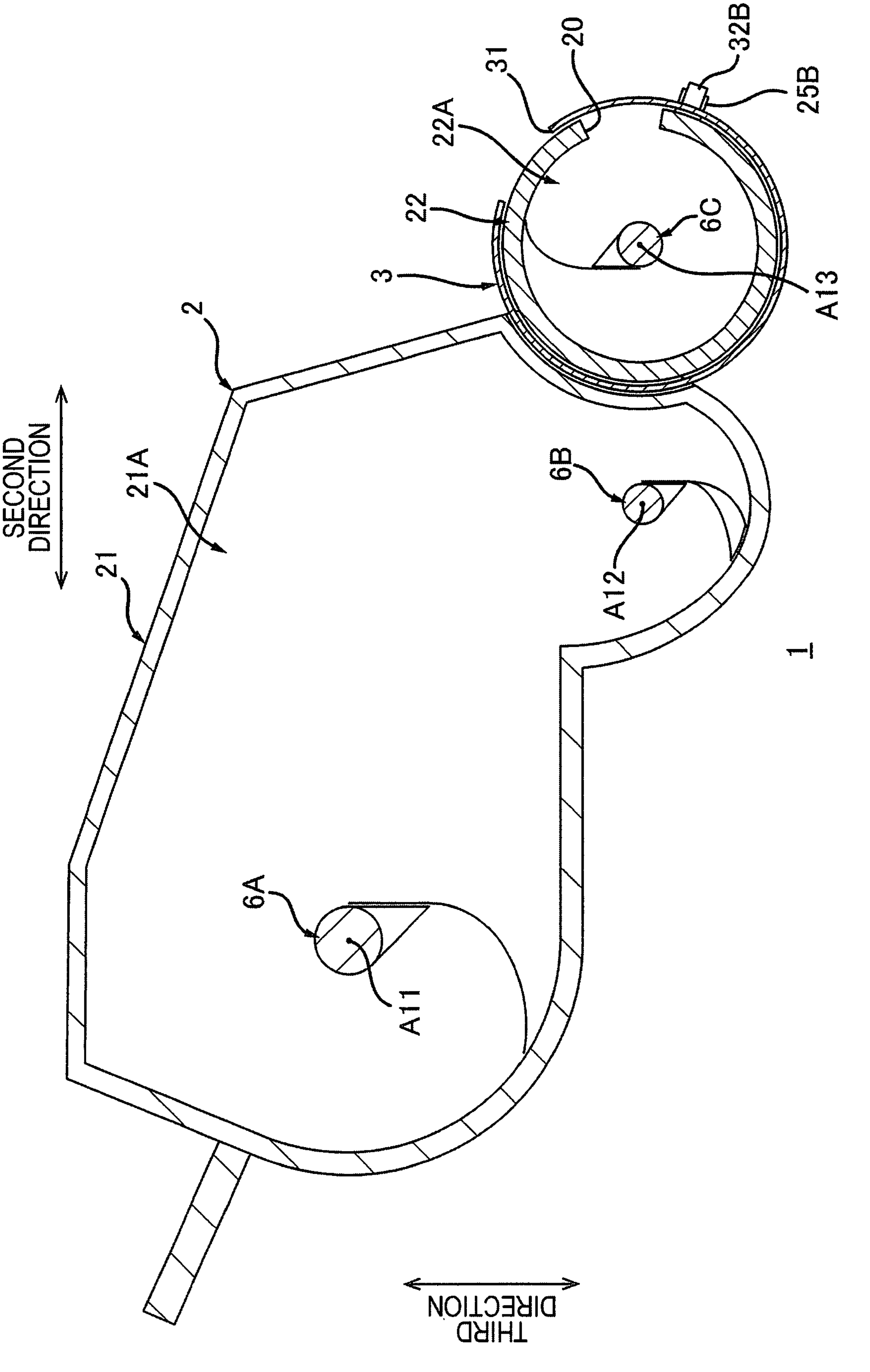
FIG. 3 is a cross-sectional view of the toner cartridge shown in FIG. 2, taken along a line III-III.

As shown in FIGS. 1 and 2, the toner cartridge 1 includes a toner housing 2, a discharge shutter 3, a reception shutter 4 (see FIG. 1), and a lever 5. As shown in FIG. 3, the toner cartridge 1 further includes a plurality of agitators 6A, 6B, and 6C.

1.1 Toner Housing 2

As shown in FIG. 1, the toner housing 2 extends in a first direction. The toner housing 2 has a cylindrical shape. The toner housing 2 stores toner. The toner housing 2 has a discharge port 20.

The discharge port 20 is located at one end of the toner housing 2 in a second direction. The second direction crosses the first direction. For example, the second direction is perpendicular to the first direction. The discharge port 20 is located between one end of the toner housing 2 and the other end of the toner housing 2 in the first direction. The discharge port 20 is located at a center portion of the toner housing 2 in the first direction. The discharge port 20 discharges the toner inside the toner housing 2.

Specifically, as shown in FIGS. 1 and 2, the toner housing 2 includes a first storage portion 21, a second storage portion 22, a reception portion 23, two ribs 24A and 24B, and two protrusions 25A and 25B.

1.1.1 First Storage Portion 21

The first storage portion 21 is located away from the discharge port 20 in the second direction. The first storage portion 21 extends in the first direction. The first storage portion 21 has a cylindrical shape. The first storage portion 21 has an end surface S1 at one end and an end surface S2 at the other end in the first direction. The end surface S1 extends in a direction crossing the first direction. For example, the end surface S1 extends in a direction perpendicular to the first direction. The end surface S2 extends in a direction crossing the first direction. For example, the end surface S2 extends in a direction perpendicular to the first direction. As shown in FIG. 3, the first storage portion 21 has a first storage chamber 21A. In other words, the toner housing 2 has the first storage chamber 21A.

The first storage chamber 21 A is an internal space of the first storage portion 21. The first storage portion 21 stores toner in the first storage chamber 21A. The first storage chamber 21A is located away from the discharge port 20 in the second direction. The volume of the first storage chamber 21A is larger than the volume of a second storage chamber 22A of the second storage portion 22. The second storage chamber 22A will be described later.

1.1.2 Second Storage Portion 22

As shown in FIGS. 1 and 2, the second storage portion 22 is located at one end of the toner housing 2 in the second direction. The second storage portion 22 is connected to one end of the first storage portion 21 in the second direction. The second storage portion 22 extends in the first direction. The second storage portion 22 has a cylindrical shape. A circumferential surface S3 of the second storage portion 22 crosses the end surface S1 of the toner housing 2 in the first direction. For example, the circumferential surface S3 of the second storage portion 22 is perpendicular to the end surface S1 of the toner housing 2 in the first direction. As shown in FIG. 3, the second storage portion 22 has the second storage chamber 22A and the discharge port 20 described above. In other words, the toner housing 2 has the second storage chamber 22A.

The second storage chamber 22 A is an internal space of the second storage portion 22. The second storage portion 22 stores toner in the second storage chamber 22A. The second storage chamber 22A is located between the first storage chamber 21A and the discharge port 20 in the second direction. The second storage chamber 22A communicates with the first storage chamber 21A. The volume of the second storage chamber 22A is smaller than the volume of the first storage chamber 21A of the first storage portion 21.

As shown in FIG. 1, the discharge port 20 is located at a center portion of the second storage portion 22 in the first direction. The discharge port 20 is located on the circumferential surface S3 of the second storage portion 22. That is, the discharge port 20 is located on the surface that crosses the end surface S1 of the toner housing 2 in the first direction. The discharge port 20 communicates with the second storage chamber 22A.

1.1.3 Reception Portion 23

Figure 4:
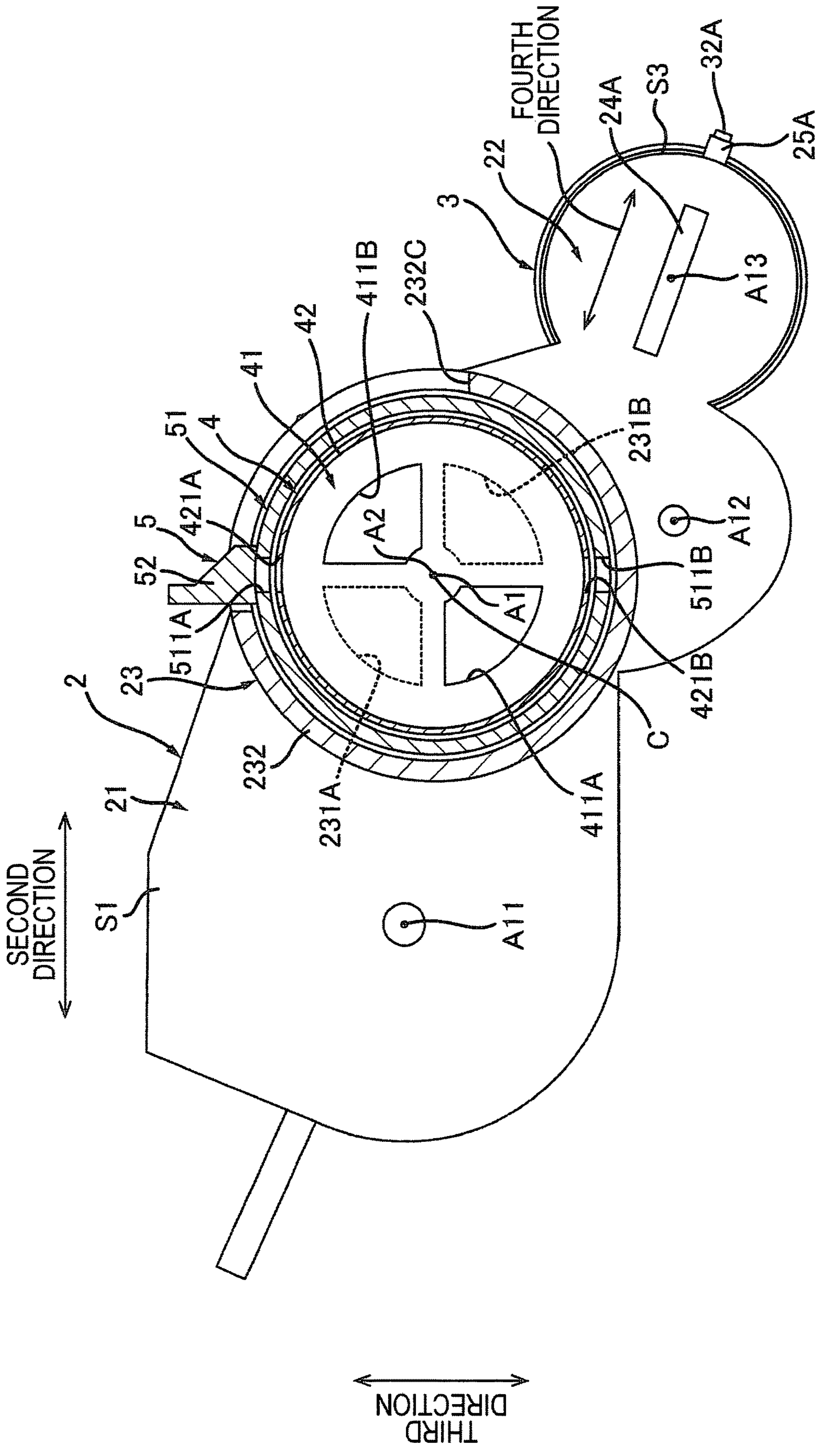
FIG. 4 is a cross-sectional view of the toner cartridge shown in FIG. 2, taken along a line IV-IV, and showing a state where a lever is located at a first position and a reception shutter is located at a reception shutter closed position.

The reception portion 23 is located at one end of the toner housing 2 in the first direction. The reception portion 23 is located at the end surface S1 of the toner housing 2 at one end in the first direction. Specifically, the reception portion 23 is located on the end surface S1 of the first storage portion 21 at one end in the first direction. The reception portion 23 is connectable to a toner container 10 (see FIG. 8). The toner container 10 will be described later. The reception portion 23 has a circular shape. As shown in FIG. 4, the reception portion 23 has a plurality of reception ports 231A and 231B and a frame 232.

1.1.3.1 Reception Ports 231A and 231B

The reception port 231A is located on the end surface S1 of the first storage portion 21 at one end in the first direction. The reception port 231A communicates with the first storage chamber 21A (see FIG. 3). The reception port 231A receives toner into the toner housing 2.

The reception port 231B is located at the end surface S1 of the first storage portion 21 at one end in the first direction. The reception port 231B is located away from the reception port 231A in the radial direction of the reception portion 23. The reception port 231B is located on the opposite side of the reception port 231A with respect to a center C of the reception portion 23 in the radial direction of the reception portion 23. The reception port 231B communicates with the first storage chamber 21A (see FIG. 3). The reception port 231B receives toner into the toner housing 2 together with the reception port 231A.

1.1.3.2 Frame 232

As shown in FIG. 1, the frame 232 supports the reception shutter 4 and the lever 5. The frame 232 protrudes from the end surface S1 of the first storage portion 21 at one end in the first direction. The frame 232 extends in the first direction. The frame 232 has a cylindrical shape. The frame 232 surrounds the reception ports 231A and 231B (see FIG. 4). The frame 232 has a plurality of grooves 232A, 232B and a through hole 232C.

The groove 232A is located at one end of the frame 232 in a third direction. The third direction crosses the first direction and the second direction. For example, the third direction is perpendicular to the first direction and the second direction. The groove 232A is located on the inner circumferential edge of the frame 232. The groove 232A is recessed outward from the inner circumferential edge of the frame 232 in the third direction.

The groove 232B is located at the other end of the frame 232 in the third direction. The groove 232B is located on the opposite side of the groove 232A with respect to the center C of the reception portion 23 (see FIG. 4) in the third direction. The groove 232B is located at the inner circumferential edge of the frame 232. The groove 232B is recessed outward from the inner circumferential edge of the frame 232 in the third direction.

The through hole 232C is located on the circumferential surface of the frame 232. The through hole 232C extends in the circumferential direction of the frame 232.

1.1.4 Ribs 24A and 24B

As shown in FIG. 1, the rib 24A is located on an end surface S11 of the second storage portion 22 at one end in the first direction. The rib 24A protrudes from the end surface S11 of the second storage portion 22 at one end in the first direction. As shown in FIG. 4, the rib 24A extends in a fourth direction.

As shown in FIG. 1, the rib 24B is located on an end surface S12 of the second storage portion 22 at the other end in the first direction. The rib 24B protrudes from the end surface S12 of the second storage portion 22 at the other end in the first direction. The rib 24B extends in the same direction as the rib 24A.

1.1.5 Protrusions 25A and 25B

As shown in FIG. 1, the protrusion 25A is located between the discharge shutter 3 and the rib 24A in the first direction. The protrusion 25A is located on the circumferential surface S3 of the second storage portion 22. As shown in FIG. 4, the protrusion 25A is located on the opposite side of the first storage portion 21 with respect to the second storage portion 22 in the fourth direction. The protrusion 25A protrudes from the circumferential surface S3 of the second storage portion 22. The protrusion 25A extends in the same direction as the rib 24A.

As shown in FIG. 1, the protrusion 25B is located between the discharge shutter 3 and the rib 24B in the first direction. The protrusion 25B is located on the circumferential surface S3 of the second storage portion 22. The protrusion 25B is located on the opposite side of the first storage portion 21 with respect to the second storage portion 22 in the fourth direction (see FIG. 4). The protrusion 25B protrudes from the circumferential surface S3 of the second storage portion 22. The protrusion 25B extends in the same direction as the rib 24A.

1.2 Discharge shutter 3

The discharge shutter 3 opens and closes the discharge port 20. The discharge shutter 3 is located on the circumferential surface S3 of the second storage portion 22. The discharge shutter 3 is located at a center portion of the second storage portion 22 in the first direction. The discharge shutter 3 extends in the first direction and in the circumferential direction of the second storage portion 22. The discharge shutter 3 has a cylindrical shape.

Figure 5:
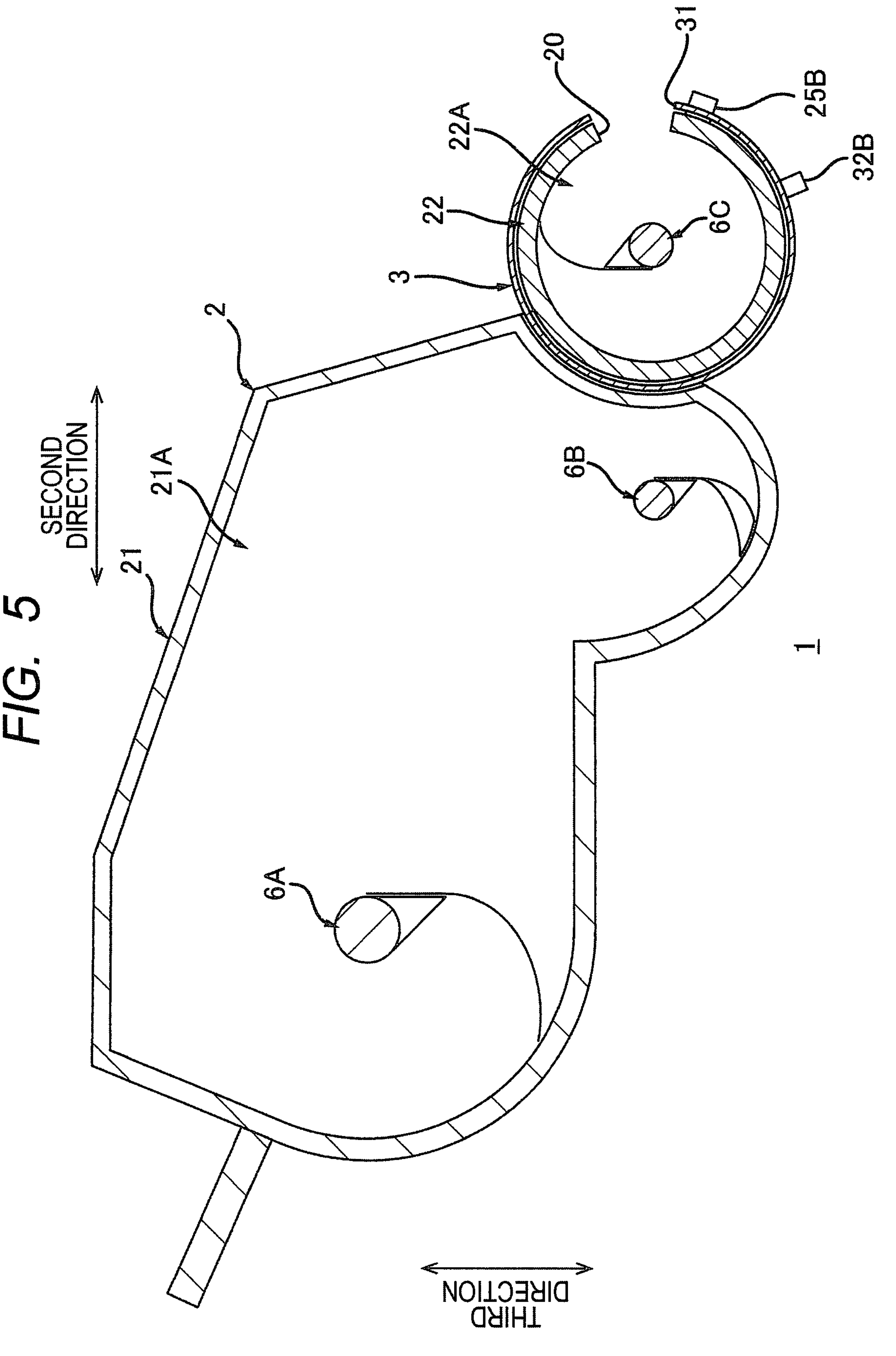
FIG. 5 shows the toner cartridge shown in FIG. 3 in a state where a discharge shutter is located at a discharge shutter open position.

As shown in FIGS. 3 and 5, the discharge shutter 3 is movable between a discharge shutter closed position (see FIG. 3) and a discharge shutter open position (see FIG. 5) in the circumferential direction of the second storage portion 22. As shown in FIG. 3, the discharge shutter 3 closes the discharge port 20 in a state where the discharge shutter 3 is located at the discharge shutter closed position. As shown in FIG. 5, the discharge port 20 is opened in a state where the discharge shutter 3 is located at the discharge shutter open position.

Specifically, as shown in FIG. 1, the discharge shutter 3 has an opening 31 and two protrusions 32A and 32B.

The opening 31 is located at a center portion of the discharge shutter 3 in the first direction. The opening 31 is located between the protrusion 32A and the protrusion 32B in the first direction. As shown in FIG. 3, in a state where the discharge shutter 3 is located at the discharge shutter closed position, the opening 31 is located away from the discharge port 20. As shown in FIG. 5, in a state where the discharge shutter 3 is located at the discharge shutter open position, at least part of the opening 31 communicates with the discharge port 20.

As shown in FIG. 1, the protrusion 32A is located at one end of the discharge shutter 3 in the first direction. The protrusion 32A is located on one side of the opening 31 in the first direction. The protrusion 32A extends from the outer circumferential surface of the discharge shutter 3. The protrusion 32A extends in a direction crossing the first direction. For example, the protrusion 32A extends in a direction perpendicular to the first direction. Specifically, the protrusion 32A extends in a radial direction of the discharge shutter 3. The protrusion 32A has a prismatic shape.

The protrusion 32B is located at the other end of the discharge shutter 3 in the first direction. The protrusion 32B is located on the other side of the opening 31 in the first direction. The protrusion 32B is located on the opposite side of the protrusion 32A with respect to the opening 31 in the first direction. The protrusion 32B extends from the outer circumferential surface of the discharge shutter 3. The protrusion 32B extends in a direction crossing the first direction. For example, the protrusion 32B extends in a direction perpendicular to the first direction. Specifically, the protrusion 32B extends in the radial direction of the discharge shutter 3. The protrusion 32B has a prismatic shape.

1.3 Reception Shutter 4

The reception shutter 4 opens and closes reception ports 231A and 231B (see FIG. 4). The reception shutter 4 is attached to the reception portion 23. The reception shutter 4 is located inside the frame 232 in the radial direction of the reception portion 23.

Figure 6:
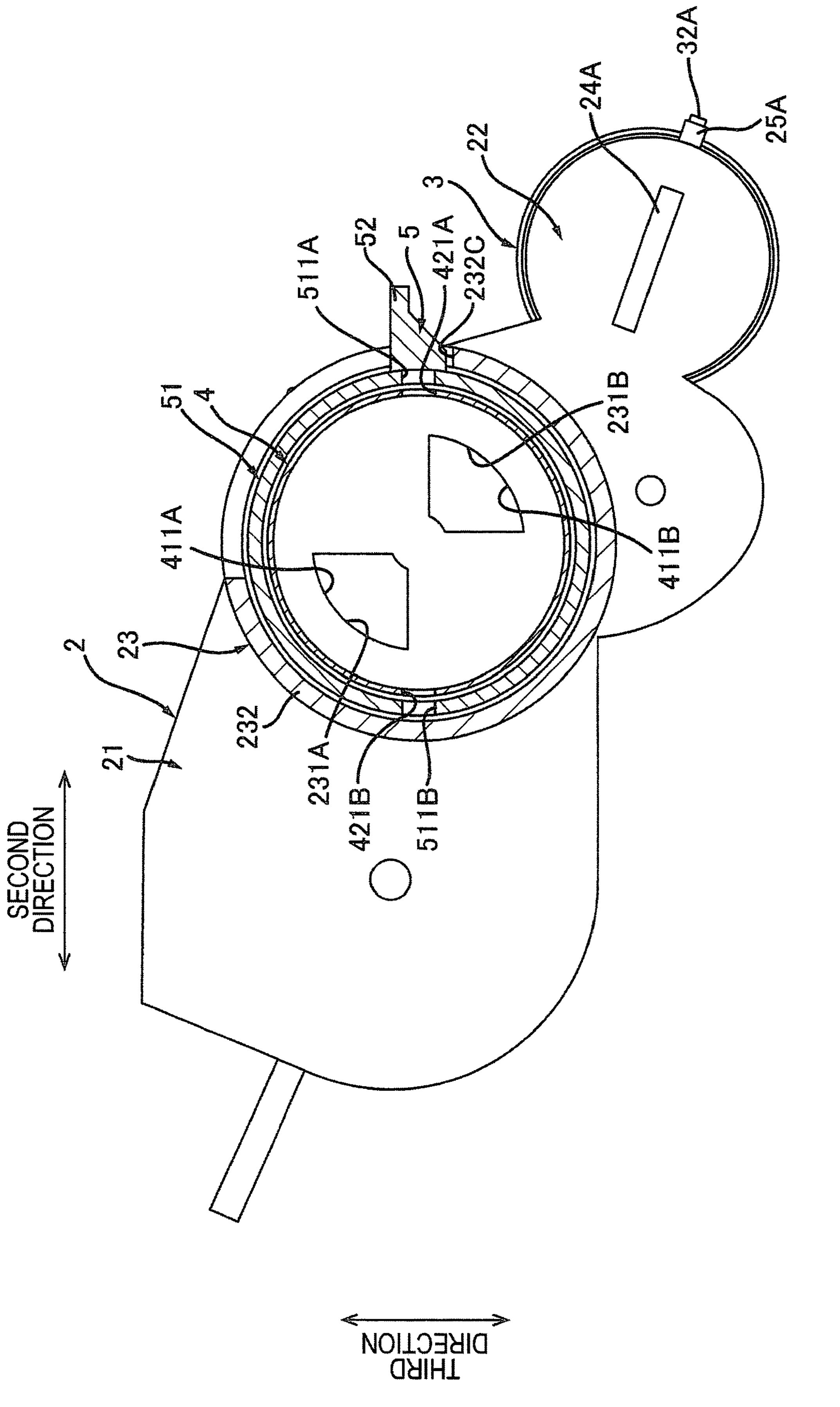
FIG. 6 shows the toner cartridge shown in FIG. 4 in a state where the lever is located at a second position and the reception shutter is located at a reception shutter open position.

As shown in FIGS. 4 and 6, the reception shutter 4 is movable between a reception shutter closed position (see FIG. 4) and a reception shutter open position (see FIG. 6). As shown in FIG. 4, the reception shutter 4 closes the reception ports 231A and 231B in a state where the reception shutter 4 is located at the reception shutter closed position. As shown in FIG. 6, the reception shutter 4 opens the reception ports 231A and 231B in a state where the reception shutter 4 is located at the reception shutter open position. The reception shutter 4 is rotatable about an axis A1 between the reception shutter closed position and the reception shutter open position. The axis A1 extends in the first direction. For example, the axis A1 is the same as the center C of the reception portion 23.

Specifically, as shown in FIG. 4, the reception shutter 4 includes a shutter main body 41 and a rib 42.

The shutter main body 41 has a disk shape. The shutter main body 41 has a plurality of openings 411A and 411B.

As shown in FIG. 4, in a state where the reception shutter 4 is located at the reception shutter closed position, the opening 411A is located away from the reception port 231A. As shown in FIG. 6, in a state where the reception shutter 4 is located at the reception shutter open position, at least part of the opening 411A communicates with the reception port 231A.

As shown in FIG. 4, the opening 411B is located away from the opening 411A in the radial direction of the shutter main body 41. The opening 411B is located on the opposite side of the opening 411A with respect to the axis A1 in the radial direction of the shutter main body 41. In a state where the reception shutter 4 is located at the reception shutter closed position, the opening 411B is located away from the reception port 231B. As shown in FIG. 6, in a state where the reception shutter 4 is located at the reception shutter open position, at least part of the opening 411B communicates with the reception port 231B.

As shown in FIG. 4, the rib 42 is located on the edge of the shutter main body 41. The rib 42 protrudes from the shutter main body 41 in the first direction. The rib 42 extends in the circumferential direction of the shutter main body 41. The rib 42 has a plurality of grooves 421A and 421B.

The groove 421A is recessed from one end edge of the rib 42 in the first direction toward the shutter main body 41. In a state where the reception shutter 4 is located at the reception shutter closed position, the groove 421A communicates with the groove 232A of the frame 232 (see FIG. 1).

The groove 421B is located on the opposite side of the groove 421A with respect to the axis A1 in the radial direction of the shutter main body 41. The groove 421B is recessed from one end edge of the rib 42 in the first direction toward the shutter main body 41. In a state where the reception shutter 4 is located at the reception shutter closed position, the groove 421B communicates with the groove 232B of the frame 232 (see FIG. 1).

1.4 Lever 5

As shown in FIGS. 4 and 6, the lever 5 is movable between a first position (see FIG. 4) and a second position (see FIG. 6). The lever 5 is rotatable about an axis A2 between the first position and the second position. The axis A2 extends in the first direction. For example, the axis A2 is the same as the center C of the reception portion 23.

Figure 7:
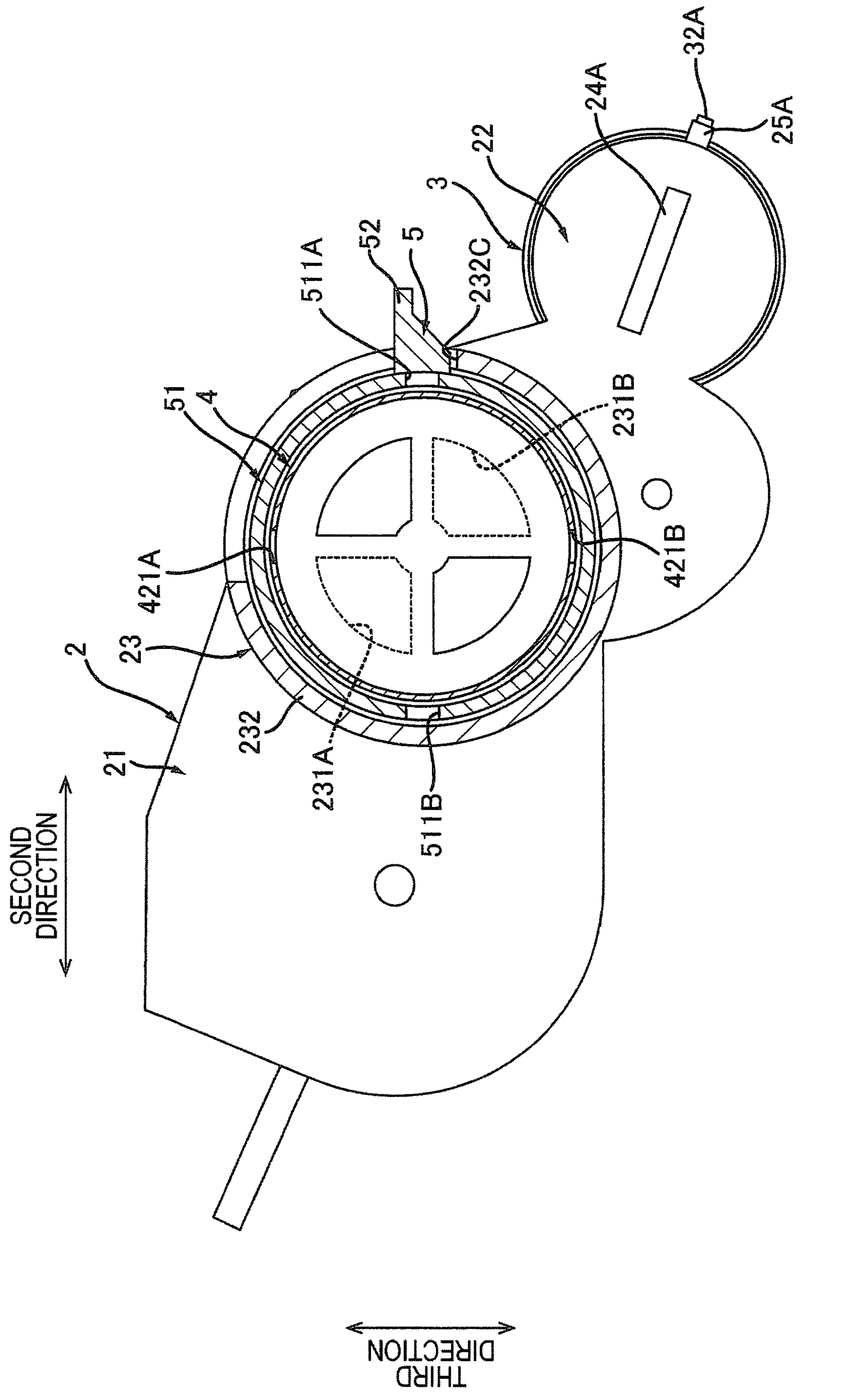
FIG. 7 shows the toner cartridge shown in FIG. 6, and shows a state where the lever is located at the second position while a toner container is not connected to the toner cartridge, and the reception shutter remains at the reception shutter closed position.

As shown in FIG. 7, in a state where the toner container 10 is detached from the toner cartridge 1, the lever 5 is rotatable relative to the reception shutter 4. Thus, even if the lever 5 moves from the first position to the second position in a state where the reception shutter 4 is located at the reception shutter closed position and the toner container 10 is detached from the toner cartridge 1, the reception shutter 4 does not move from the reception shutter closed position.

As shown in FIG. 4, the lever 5 includes an engaging portion 51 and a protruding portion 52.

In a state where the toner container 10 (see FIG. 8) is connected to the reception portion 23, the engaging portion 51, together with the reception shutter 4, engages with a container shutter 12 (see FIG. 8) of the toner container 10. The container shutter 12 will be described later. The engaging portion 51 has a ring shape. The engaging portion 51 is located inside the frame 232 in the radial direction of the reception portion 23. The engaging portion 51 is located outside the reception shutter 4 in the radial direction of the reception portion 23. The engaging portion 51 has a plurality of grooves 511A and 511B.

The groove 511A is recessed from one end edge of the engaging portion 51 toward the other side in the first direction. In a state where the reception shutter 4 is located at the reception shutter closed position and the lever 5 is located at the first position, the groove 511A communicates with the groove 421A of the reception shutter 4 and the groove 232A of the frame 232 (see FIG. 1).

The groove 511B is located on the opposite side of the groove 511A with respect to the axis A2 in the radial direction of the engaging portion 51. The groove 511B is recessed from one end edge of the engaging portion 51 toward the other side in the first direction. In a state where the reception shutter 4 is located at the reception shutter closed position and the lever 5 is located at the first position, the groove 511B communicates with the groove 421B of the reception shutter 4 and the groove 232B of the frame 232 (see FIG. 1).

The protruding portion 52 is located outside the engaging portion 51 in the radial direction of the engaging portion 51. The protruding portion 52 extends in the radial direction of the engaging portion 51. The protruding portion 52 extends from the engaging portion 51. The protruding portion 52 protrudes outside the frame 232 through the through hole 232C of the frame 232.

1.5 Agitators 6A, 6B, and 6C

As shown in FIG. 3, the agitator 6A is located inside the first storage chamber 21A. The agitator 6A is located away from the second storage chamber 22A in the second direction. The agitator 6A conveys the toner in the first storage chamber 21A toward the second storage chamber 22A. The agitator 6A is rotatable about an agitator axis A11. The agitator axis A11 extends in the first direction. The agitator axis A11 is located on one side of the second storage portion 22 in the third direction.

The agitator 6B is located inside the first storage chamber 21A. The agitator 6B is located between the agitator 6A and the second storage chamber 22A in the second direction. The agitator 6B conveys, together with the agitator 6A, the toner in the first storage chamber 21A toward the second storage chamber 22A. The agitator 6B is rotatable about an agitator axis A12. The agitator axis A12 extends in the first direction. The agitator axis A12 is located on the other side of the agitator axis A11 in the third direction.

The agitator 6C is located in the second storage chamber 22A. The agitator 6C conveys the toner in the second storage chamber 22A toward the discharge port 20. The agitator 6C is rotatable about an agitator axis A13. The agitator axis A13 extends in the first direction. The agitator axis A13 is aligned with the agitator axis A12 in the second direction. The second direction is the direction connecting the agitator axis A12 and the agitator axis A13.

2. Toner Container 10

Next, details of the toner container 10 will be described with reference to FIGS. 8 to 15.

Figure 8:
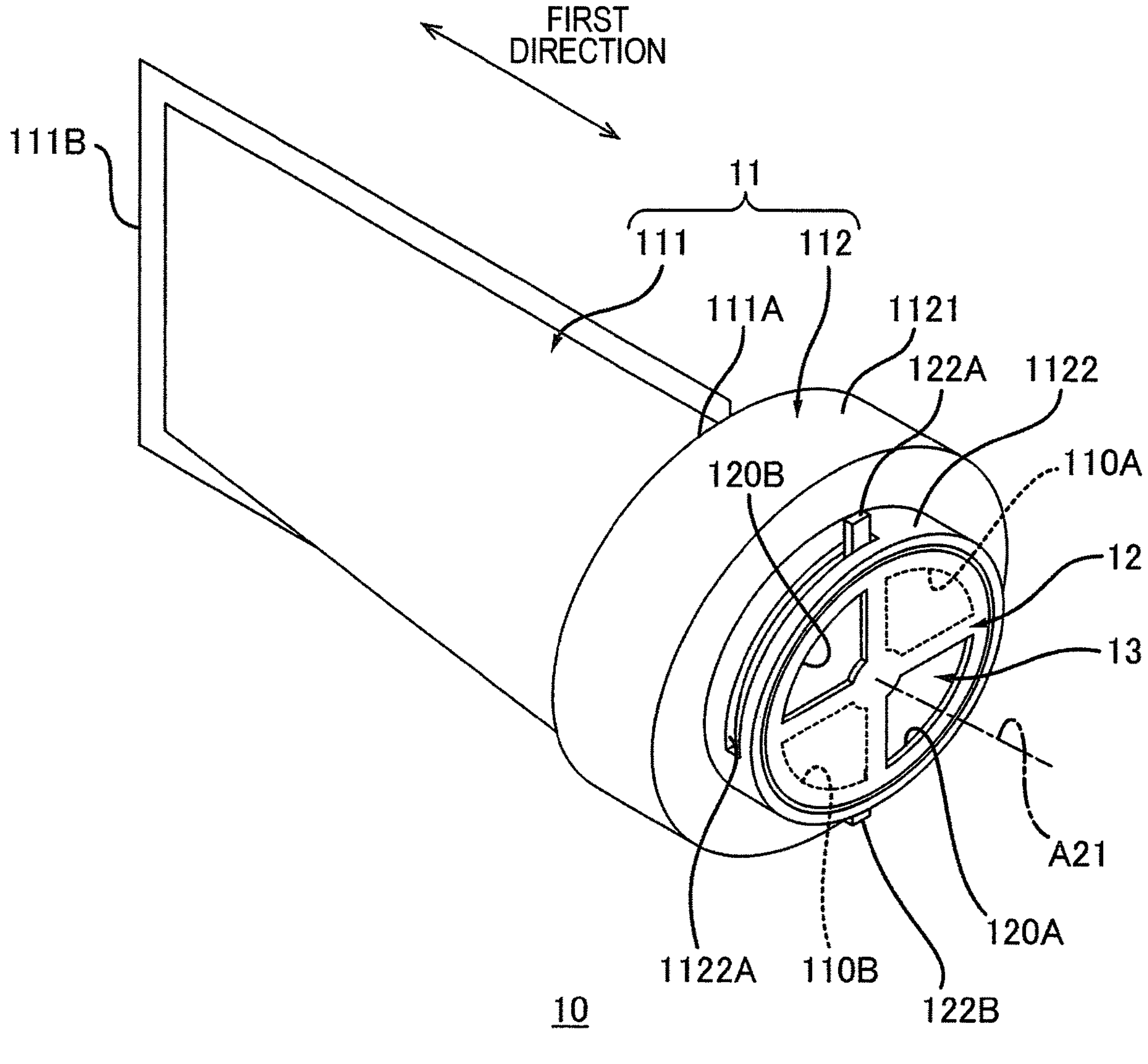
FIG. 8 is a perspective view of the toner container.

The toner container 10 shown in FIG. 8 is configured to contain toner. The toner in the toner container 10 is supplied to the toner housing 2 (see FIG. 9) of the toner cartridge 1 described above.

Figure 9:
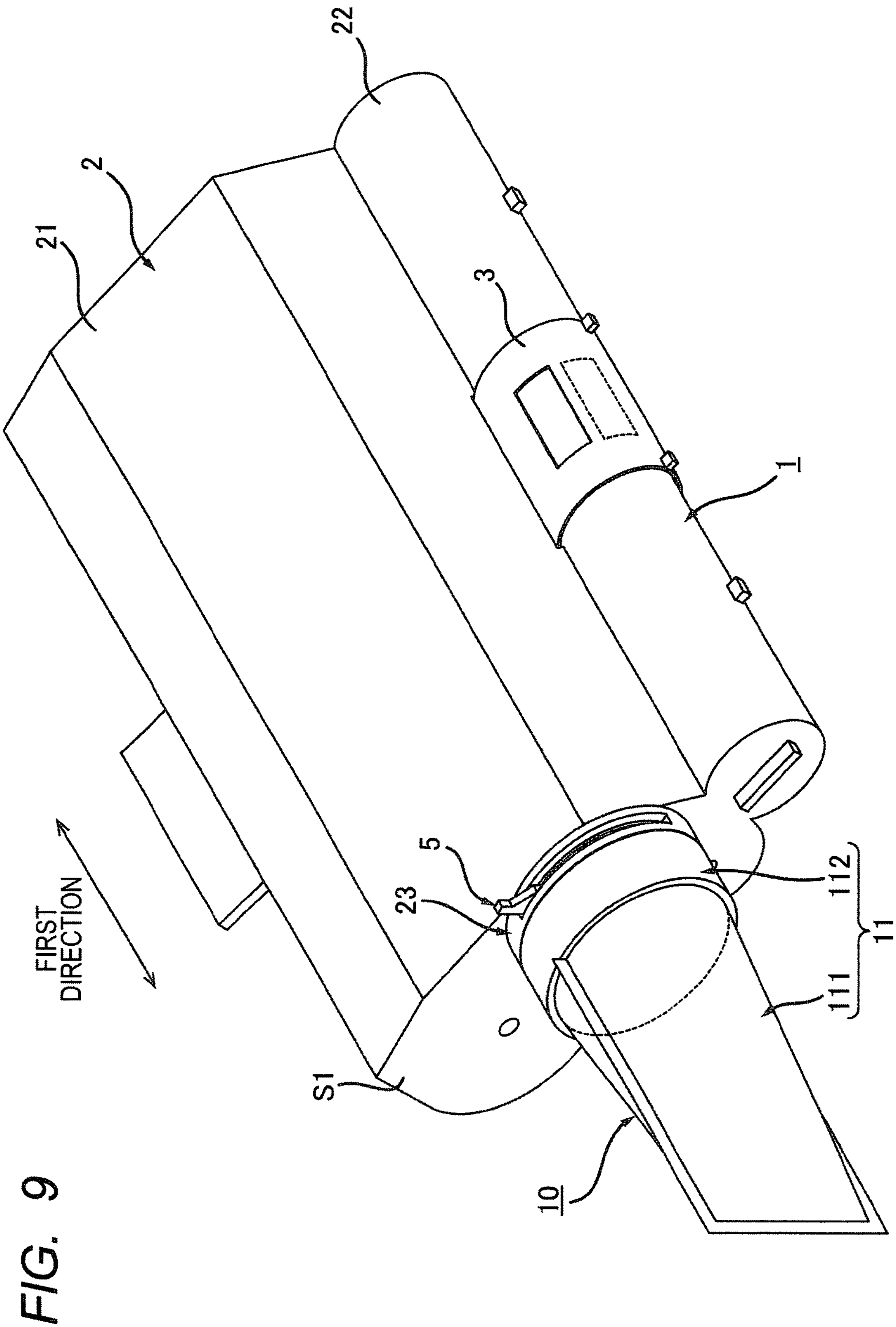
FIG. 9 shows a state where the toner container is connected to a reception portion of the toner cartridge and the lever is located at the first position.

Specifically, as shown in FIG. 9, in order to supply toner to the toner cartridge 1, in a state where the toner cartridge 1 is detached from the image forming apparatus and the reception shutter 4 (see FIG. 1) is located at the reception shutter closed position, the user connects the toner container 10 containing toner to the reception portion 23 of the toner cartridge 1 (connecting step).

Figure 10:
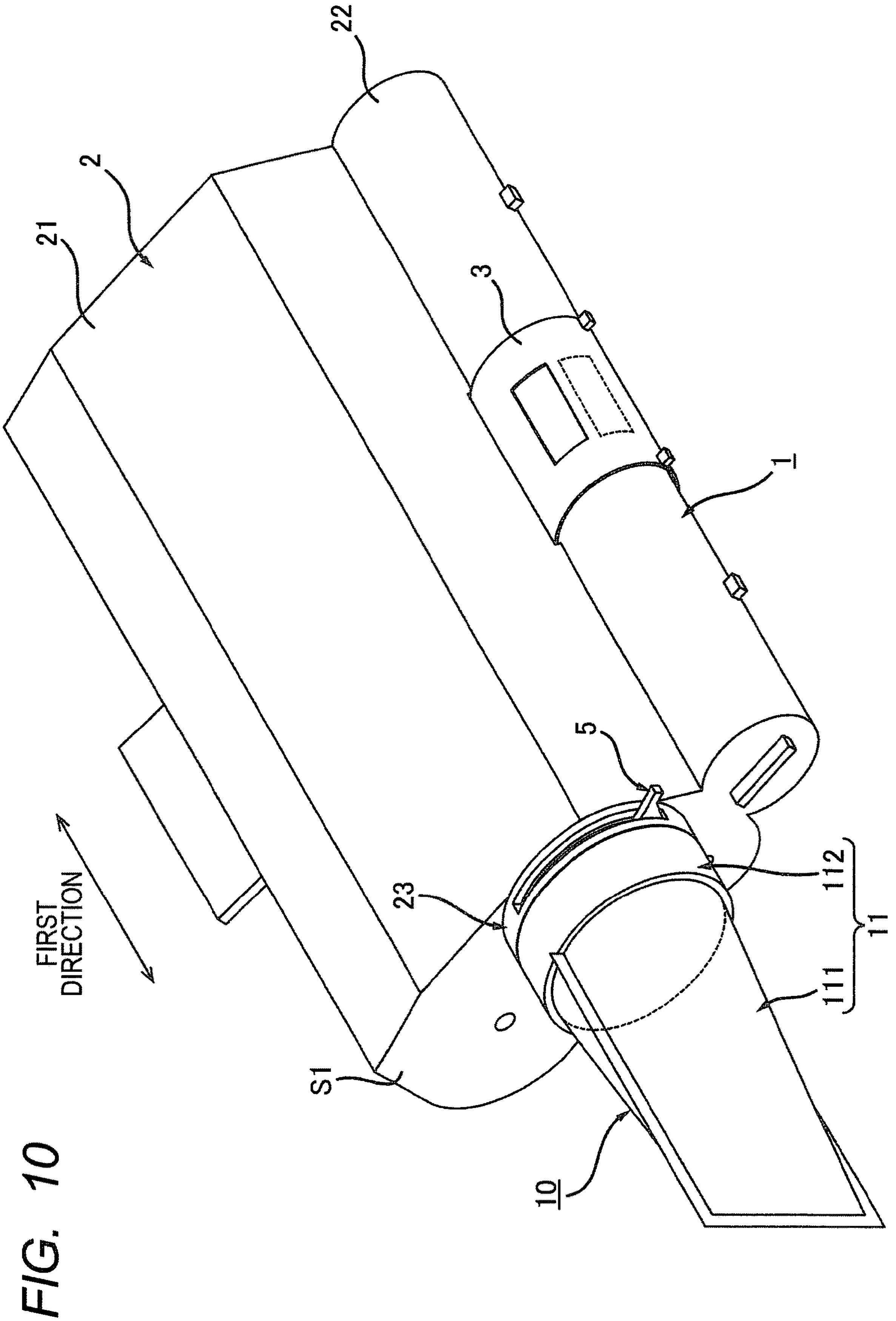
FIG. 10 shows a state where the toner container is connected to the reception portion of the toner cartridge and the lever is located at the second position.

Next, as shown in FIG. 10, in a state where the toner container 10 is connected to the reception portion 23, the user moves the lever 5 from the first position to the second position, thereby moving the reception shutter 4 from the reception shutter closed position to the reception shutter open position (shutter opening step). In a state where the toner container 10 is connected to the reception portion 23 and the reception shutter 4 is located at the reception shutter open position, the reception ports 231A and 231B (see FIG. 6) is configured to receive toner from the toner container 10. In a state where the toner container 10 is connected to the reception portion 23 and the reception shutter 4 is located at the reception shutter open position, the toner container 10 is undetachable from the toner cartridge 1.

Figure 11:
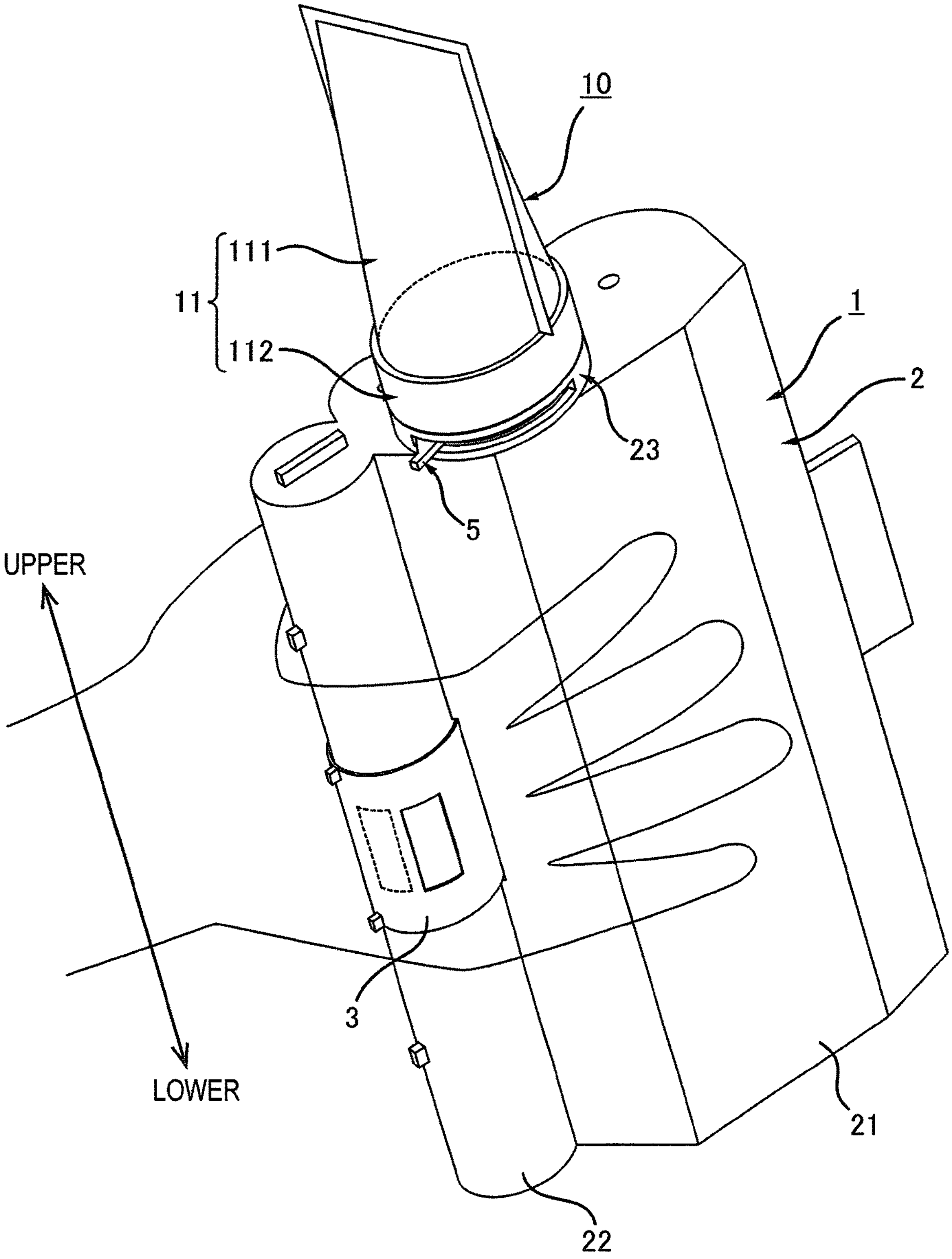
FIG. 11 shows a state where the toner container is connected to the reception portion of the toner cartridge, the lever is located at the second position, and the toner container is located above the toner cartridge.

Next, as shown in FIG. 11, in a state where the toner container 10 is connected to the reception portion 23 and the reception shutter 4 is located at the reception shutter open position, the user causes the toner container 10 to be located above the toner cartridge 1 and supplies the toner in the toner container 10 into the toner housing 2.

At this time, since the toner container 10 is undetachable from the toner cartridge 1, the user shakes the toner cartridge 1 in a state where the toner container 10 is connected to the reception portion 23. Thus, the toner in the toner container 10 is smoothly supplied into the toner housing 2.

Next, as shown in FIG. 9, in a state where the toner container 10 is connected to the reception portion 23, the user moves the lever 5 from the second position to the first position, thereby moving the reception shutter 4 from the reception shutter open position to the reception shutter closed position (shutter closing step). In a state where the toner container 10 is connected to the reception portion 23 and the reception shutter 4 is located at the reception shutter closed position, the toner container 10 is detachable from the toner cartridge 1.

After that, the user detaches the toner container 10 from the toner cartridge 1. This completes supply of toner.

Figure 12:
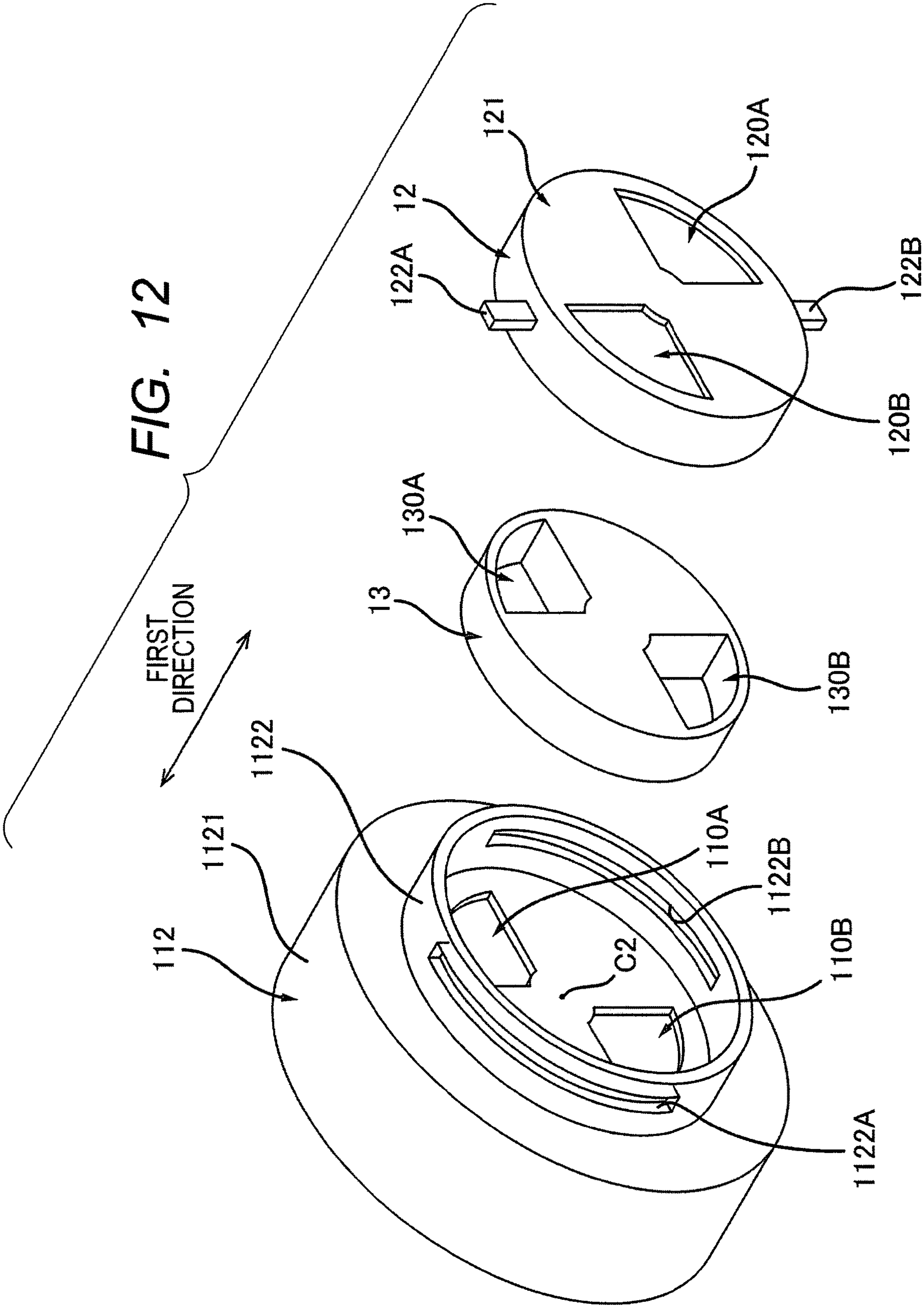
FIG. 12 is an exploded perspective view of the toner container shown in FIG. 8, showing a base, a container shutter, and a seal member.

Specifically, as shown in FIGS. 8 and 12, the toner container 10 includes a container main body 11, the container shutter 12, and a seal member 13.

In the following description, the "first direction" of the toner container 10 is the "first direction" in a state where the toner container 10 is connected to the reception portion 23 of the toner cartridge 1.

2.1 Container Main Body 11

As shown in FIG. 8, the container main body 11 is configured to contain toner. In this embodiment, the container main body 11 includes a pouch 111 and a connection member 112.

The pouch 111 is made of a soft resin, for example. The pouch 111 is configured to contain toner therein. The pouch 111 extends in the first direction. The pouch 111 has one end 111A and an other end 111B in the first direction. The one end 111A has an opening (not shown). The other end 111B is located away from the one end 111A in the first direction.

The connection member 112 is connected to the one end 111A of the pouch 111.

The connection member 112 closes an opening (not shown) of the pouch 111. As shown in FIG. 9, in a state where the toner container 10 is connected to the reception portion 23 of the toner cartridge 1, the connection member 112 is connected to the reception portion 23. The connection member 112 is made of hard resin, for example. As shown in FIG. 12, the connection member 112 includes a base 1121 and a protruding portion 1122.

The base 1121 is connected to the one end 111A of the pouch 111. The base 1121 extends in the first direction. The base 1121 has a cylindrical shape. The base 1121 has a plurality of discharge ports 110A and 110B. That is, the container main body 11 has the discharge ports 110A and 110B.

The discharge port 110A is located at the end surface of the base 1121 in the first direction. The discharge port 110A communicates with the inner space of the pouch 111. The discharge port 110A discharges the toner inside the container main body 11.

The discharge port 110B is located at the end surface of the base 1121 in the first direction. The discharge port 110B is located away from the discharge port 110A in the radial direction of the base 1121. The discharge port 110B is located on the opposite side of the discharge port 110A with respect to a center C2 of the base 1121 in the radial direction of the base 1121. The discharge port 110B communicates with the inner space of the pouch 111. The discharge port 110B discharges the toner in the container main body 11 together with the discharge port 110A.

The protruding portion 1122 extends from the end surface of the base 1121 in the first direction. The protruding portion 1122 extends in the first direction. The protruding portion 1122 has a cylindrical shape. The protruding portion 1122 supports the container shutter 12. The protruding portion 1122 surrounds the discharge ports 110A and 110B. The protruding portion 1122 has a plurality of through holes 1122A and 1122B.

The through hole 1122A is located on the circumferential surface of the protruding portion 1122. The through hole 1122A extends in the circumferential direction of the protruding portion 1122.

The through hole 1122B is located on the circumferential surface of protruding portion 1122. The through hole 1122B is located away from the through hole 1122A in the circumferential direction of the protruding portion 1122. The through hole 1122B is located on the opposite side of the through hole 1122A with respect to the center C2 of the base 1121 in the radial direction of the base 1121. The through hole 1122B extends in the circumferential direction of the protruding portion 1122.

2.2 Container Shutter 12

As shown in FIG. 8, the container shutter 12 is attached to the protruding portion 1122. The container shutter 12 is located inside the protruding portion 1122 in the radial direction of the protruding portion 1122. The container shutter 12 opens and closes the discharge ports 110A and 110B of the container main body 11.

Figure 13:
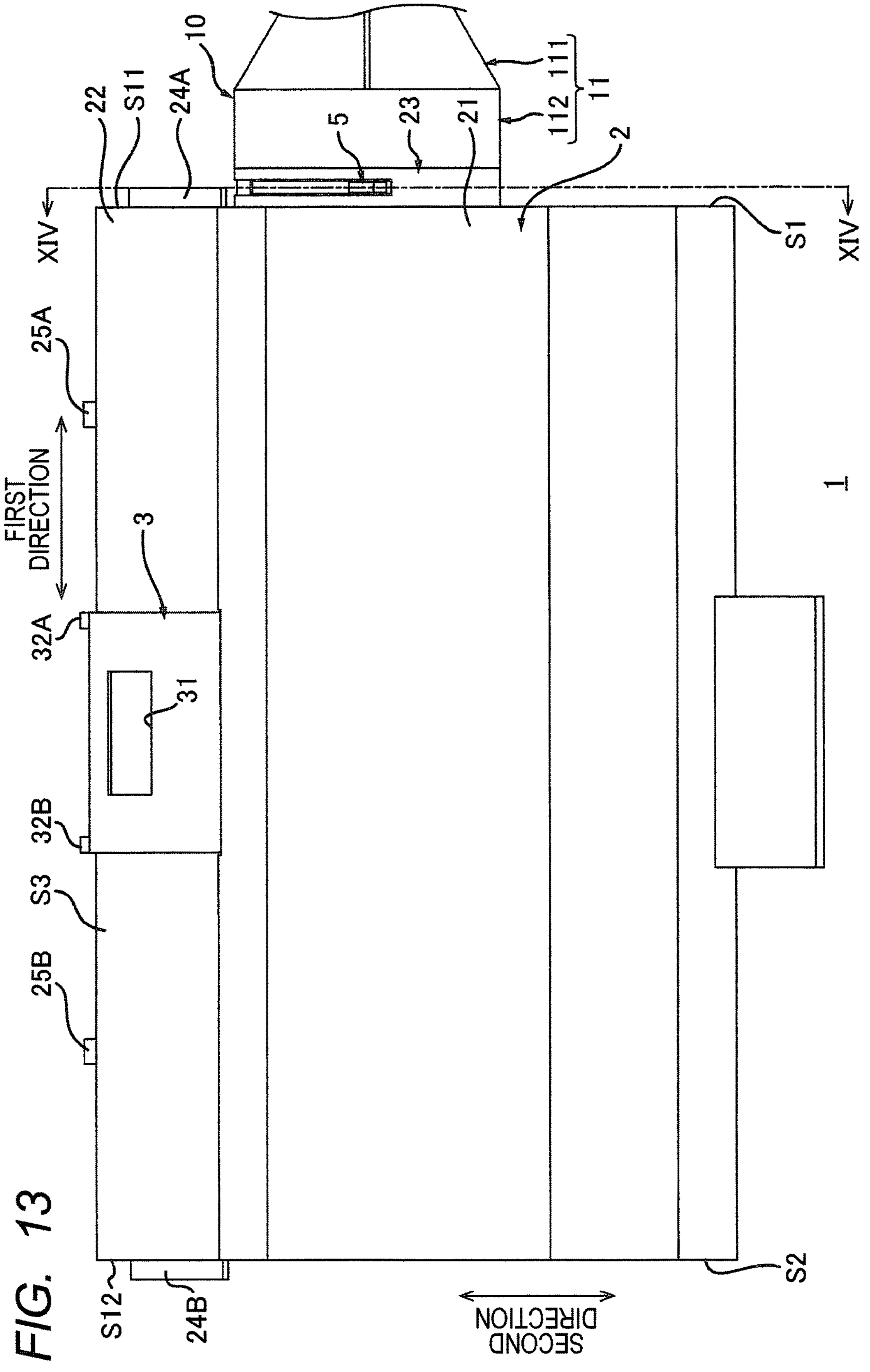
FIG. 13 is a plan view of the toner cartridge shown in FIG. 9.
Figure 14:
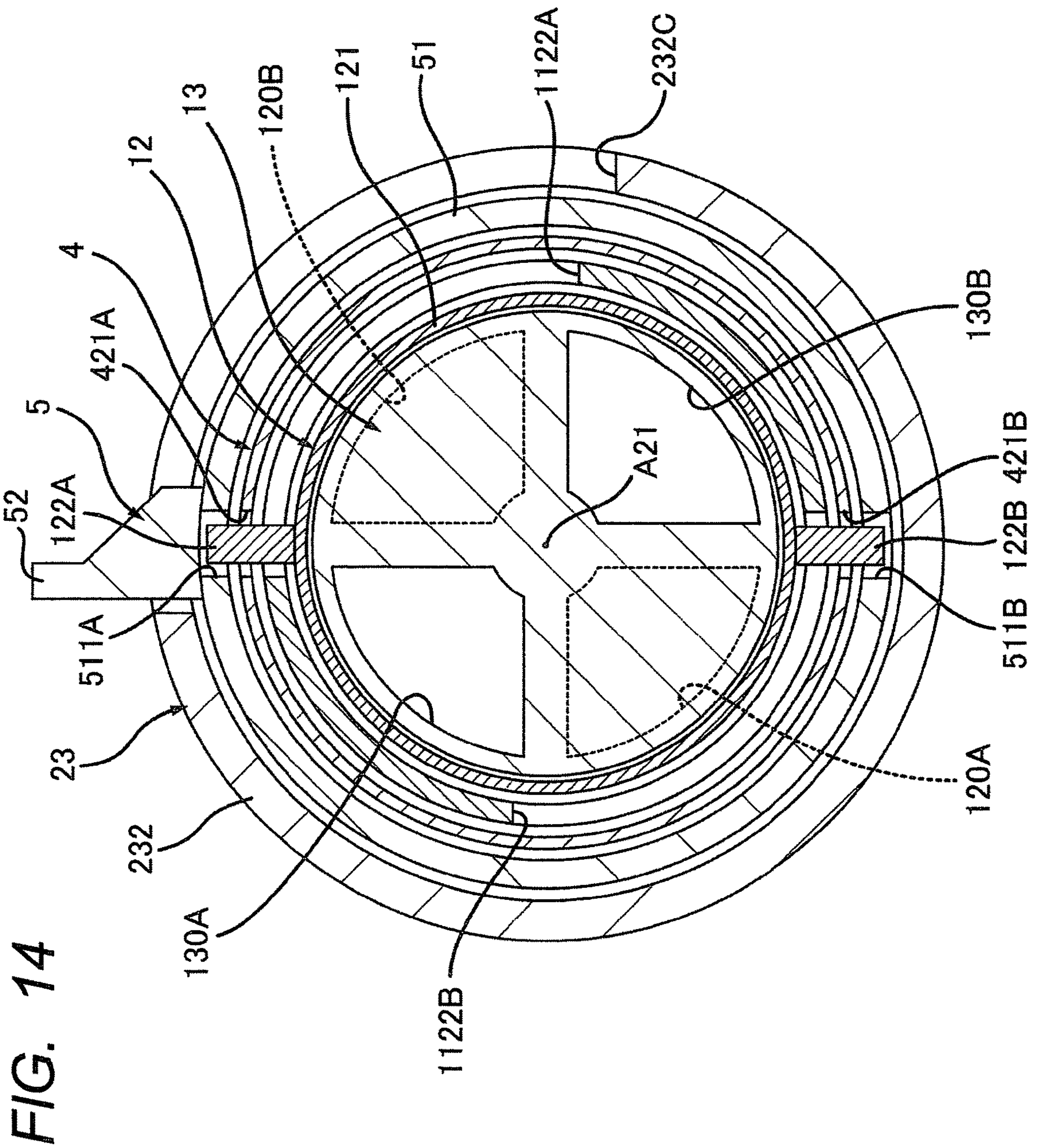
FIG. 14 is a cross-sectional view of the toner cartridge shown in FIG. 13, taken along a line XIV-XIV, showing a state where the lever is located at the first position, the reception shutter is located at the reception shutter closed position, and the container shutter is located at a container shutter closed position.
Figure 15:
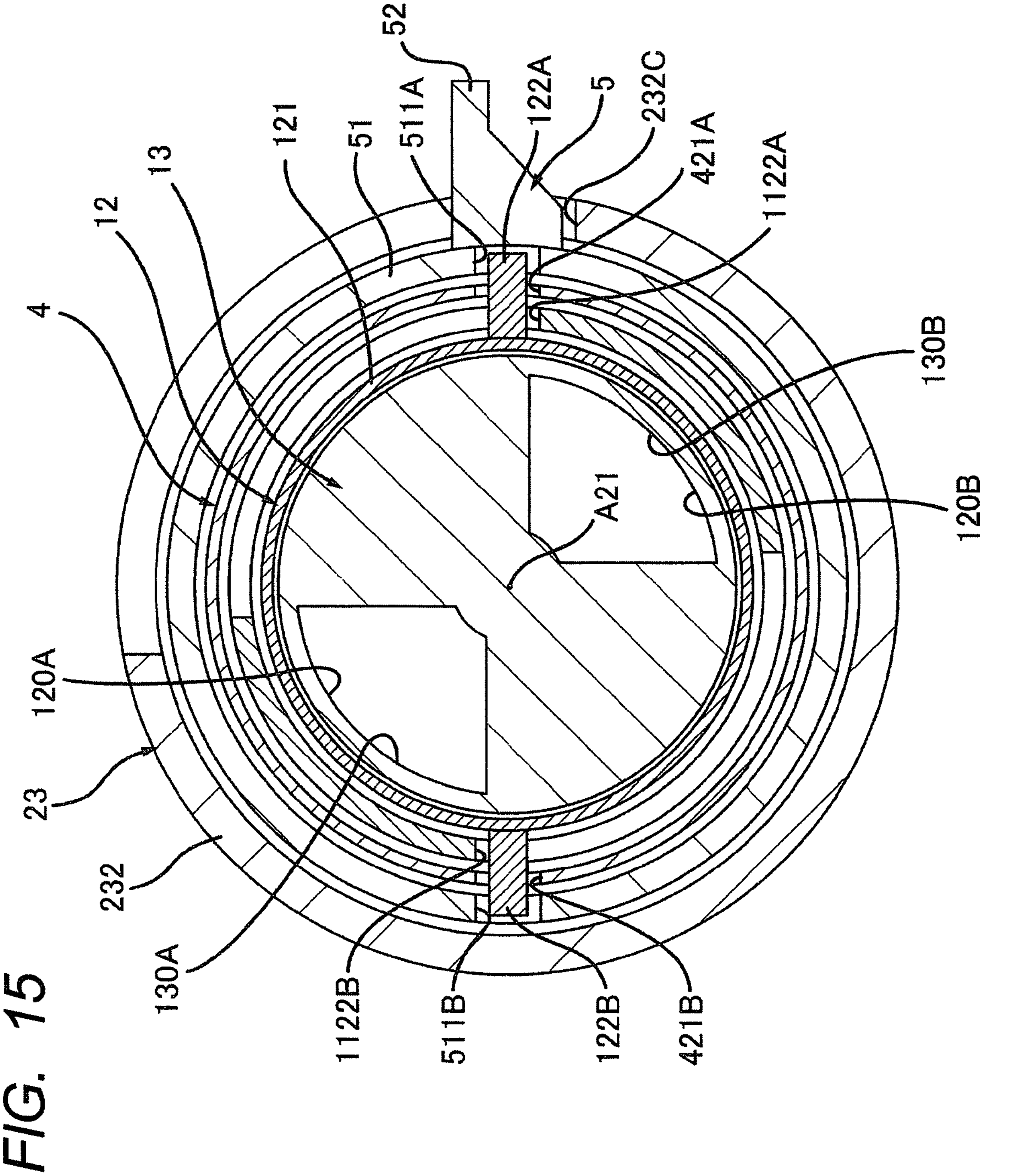
FIG. 15 is a cross-sectional view corresponding to FIG. 14, showing a state where the lever is located at the second position, the reception shutter is located at the reception shutter open position, and the container shutter is located at a container shutter open position.

As shown in FIGS. 13, 14 and 15, the container shutter 12 is movable between a container shutter closed position (see FIGS. 13 and 14) and a container shutter open position (see FIG. 15). As shown in FIG. 14, in a state where the container shutter 12 is located at the container shutter closed position, the container shutter 12 closes the discharge ports 110A and 110B (see FIG. 8). As shown in FIG. 15, in a state where the container shutter 12 is located at the container shutter open position, the container shutter 12 opens the discharge ports 110A and 110B. The container shutter 12 is rotatable about an axis A21 between the container shutter closed position and the container shutter open position. The axis A21 extends in the first direction. For example, the axis A21 is the same as the center C2 of base 1121 (see FIG. 12).

Specifically, as shown in FIG. 12, the container shutter 12 includes a shutter main body 121 and a plurality of protrusions 122A and 122B.

The shutter main body 121 has a cylindrical shape. The shutter main body 121 has a plurality of openings 120A and 120B.

As shown in FIG. 8, in a state where the container shutter 12 is located at the container shutter closed position, the opening 120A is located away from the discharge port 110A. In a state where the container shutter 12 is located at the container shutter open position (see FIG. 15), at least part of the opening 120A communicates with the discharge port 110A.

As shown in FIG. 12, the opening 120B is located away from the opening 120A in the radial direction of the shutter main body 121. As shown in FIG. 8, the opening 120B is located on the opposite side of the opening 120A with respect to the axis A21 in the radial direction of the shutter main body 121. In a state where the container shutter 12 is located at the container shutter closed position, the opening 120B is located away from the discharge port 110B. In a state where the container shutter 12 is located at the container shutter open position (see FIG. 15), at least part of the opening 120B communicates with the discharge port 110B.

As shown in FIG. 12, the protrusion 122A is located on the circumferential surface of the shutter main body 121. The protrusion 122A protrudes from the circumferential surface of the shutter main body 121. The protrusion 122A extends in a radial direction of the shutter main body 121. As shown in FIG. 8, the protrusion 122A protrudes outside the protruding portion 1122 through the through hole 1122A of the protruding portion 1122.

The protrusion 122B is located on the opposite side of the protrusion 122A with respect to the axis A21 (see FIG. 8) in the radial direction of the shutter main body 121. The protrusion 122B is located on the circumferential surface of the shutter main body 121. The protrusion 122B protrudes from the circumferential surface of the shutter main body 121. The protrusion 122B extends in a radial direction of the shutter main body 121. The protrusion 122B protrudes outside the protruding portion 1122 through the through hole 1122B (see FIG. 12) of the protruding portion 1122.

As shown in FIG. 14, when the toner container 10 is connected to the reception portion 23 of the toner cartridge 1 in a state where the reception shutter 4 of the toner cartridge 1 is located at the reception shutter closed position, the lever 5 of the toner cartridge 1 is located at the first position, and the container shutter 12 of the toner container 10 is located at the container shutter closed position, the protrusion 122A fits into the groove 421A of the reception shutter 4 and the groove 511A of the lever 5 through the groove 232A (see FIG. 1) of the frame 232. Further, the protrusion 122B fits into the groove 421B of the reception shutter 4 and the groove 511B of the lever 5 through the groove 232B (see FIG. 1) of the frame 232. In a state where the protrusion 122A fits in the groove 421A and the groove 511A and the protrusion 122B fits in the groove 421B and the groove 511B, the container shutter 12 is movable together with the reception shutter 4 and the lever 5.

Thus, as shown in FIGS. 9 and 10, when the user moves the lever 5 from the first position (see FIG. 9) to the second position (see FIG. 10) in the shutter opening step, the container shutter 12 moves from the container shutter closed position (see FIG. 14) to the container shutter open position (see FIG. 15), and the reception shutter 4 moves from the reception shutter closed position (see FIG. 14) to the reception shutter open position (see FIG. 15)

That is, as shown in FIG. 14, in a state where the toner container 10 is connected to the reception portion 23 and the lever 5 is located at the second position, the lever 5 causes the container shutter 12 to be located at the container shutter open position and causes the reception shutter 4 to be located at the reception shutter open position. Thus, in a state where the toner container 10 is connected to the reception portion 23 and the reception shutter 4 is located at the reception shutter open position, the container shutter 12 opens the discharge ports 110A and 110B (see FIG. 8) of the container main body 11.

In a state where the toner container 10 is connected to the reception portion 23 and the container shutter 12 is located at the container shutter open position, the protrusions 122A and 122B of the container shutter 12 engages with the inner circumferential edge of the frame 232 (see FIG. 1). Thus, as described above and shown in FIG. 10, in a state where the toner container 10 is connected to the reception portion 23 and the reception shutter 4 is located at the reception shutter open position, the toner container 10 is undetachable from the toner cartridge 1.

In the shutter closing step described above, when the user moves the lever 5 from the second position (see FIG. 10) to the first position (see FIG. 9), the container shutter 12 moves from the container shutter open position to the container shutter closed position, and the reception shutter 4 moves from the reception shutter open position to the reception shutter closed position.

That is, as shown in FIG. 12, in a state where the toner container 10 is connected to the reception portion 23 and the lever 5 is located at the first position, the lever 5 causes the container shutter 12 to be located at the container shutter closed position and causes the reception shutter 4 to be located at the reception shutter closed position. In a state where the toner container 10 is connected to the reception portion 23 and the reception shutter 4 is located at the reception shutter closed position, the container shutter 12 closes the discharge ports 110A and 110B (see FIG. 7) of the container main body 11.

In a state where the toner container 10 is connected to the reception portion 23 and the container shutter 12 is located at the container shutter closed position, the protrusion 122A of the container shutter 12 overlaps the groove 232A of the frame 232 (see FIG. 1), and the protrusion 122B of the container shutter 12 overlaps the groove 232B of the frame 232 (see FIG. 1). Thus, as described above and shown in FIG. 9, in a state where the toner container 10 is connected to the reception portion 23 and the reception shutter 4 is located at the reception shutter closed position, the toner container 10 is detachable from the toner cartridge 1.

2.3 Seal Member 13

As shown in FIG. 12, the seal member 13 seals between the base 1121 of the connection member 112 and the shutter main body 121 of the container shutter 12. The seal member 13 is located between the base 1121 of the connection member 112 and the shutter main body 121 of the container shutter 12 in the first direction. The seal member 13 is fixed to the base 1121 of the connection member 112. As shown in FIG. 14, the seal member 13 is located inside the shutter main body 121 in the radial direction of the shutter main body 121. The seal member 13 has a disc shape. The seal member 13 is made of sponge, for example. The seal member 13 has a plurality of openings 130A and 130B. At least part of the opening 130A communicates with the discharge port 110A (see FIG. 12). At least part of the opening 130B communicates with the discharge port 110B (see FIG. 12).

4. Image Forming Apparatus 100

Next, an image forming apparatus 100 to which the toner cartridge 1 is attached will be described with reference to FIGS. 16 to 23.

In the following description of the image forming apparatus 100, "first direction," "second direction," and "third direction" mean "first direction", "second direction" and "third direction" in a state where the toner cartridge 1 is attached to the image forming apparatus 100.

4.1 Outline of Image Forming Apparatus 100

Figure 16:
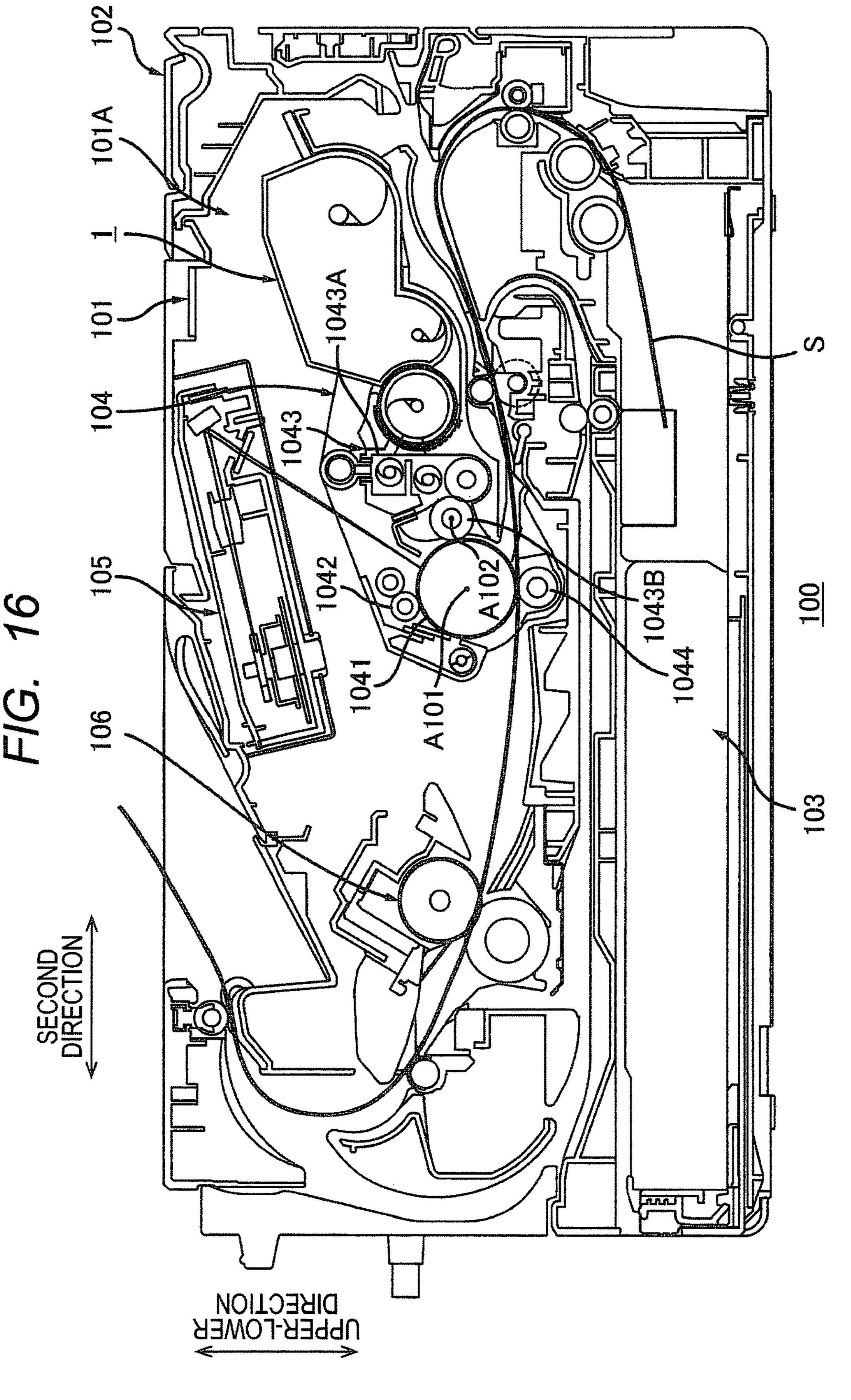
FIG. 16 is a schematic configuration diagram of an image forming apparatus to which the toner cartridge shown in FIG. 1 is attached.

As shown in FIG. 16, the image forming apparatus 100 includes a main housing 101, a cover 102, a sheet storage section 103, a drum cartridge 104, the toner cartridge 1 described above, an exposure device 105, and a fuser (fixing device) 106.

4.1.1 Main Housing 101

The main housing 101 accommodates the sheet storage section 103, the drum cartridge 104, the exposure device 105, and the fuser 106. The main housing 101 has an opening 101A (see FIG. 17).

4.1.2 Cover 102

Figure 17:
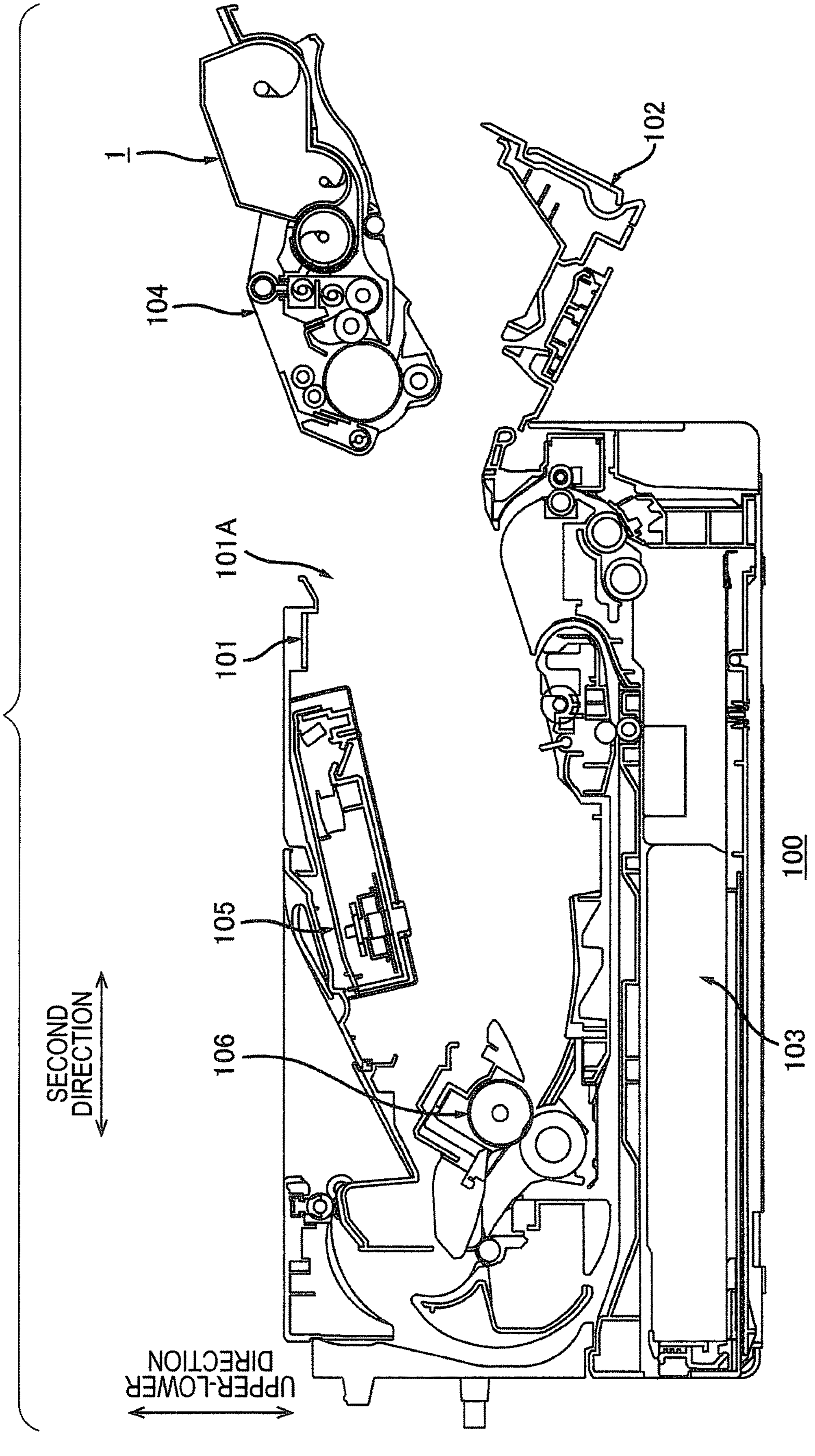
FIG. 17 shows a state where a drum cartridge shown in FIG. 16 is detached from the image forming apparatus.

The cover 102 is movable between a cover closed position (see FIG. 16) and a cover open position (see FIG. 17). As shown in FIG. 16, the cover 102 closes the opening 101A in a state where the cover 102 is located at the cover closed position. As shown in FIG. 17, the opening 101A is opened in a state where the cover 102 is located at the cover open position.

4.1.3 Sheet Storage Section 103

As shown in FIG. 16, the sheet storage section 103 is configured to store sheets S therein.

The sheet S in the sheet storage section 103 is conveyed toward a transfer roller 1044. The transfer roller 1044 will be described later.

4.1.4 Drum Cartridge 104

The drum cartridge 104 is attached to the image forming apparatus 100. In a state where the drum cartridge 104 is attached to the image forming apparatus 100, the drum cartridge 104 is located inside the main housing 101. As shown in FIG. 17, in a state where the cover 102 is located at the cover open position, the drum cartridge 104 is attachable to and detachable from the image forming apparatus 100 through the opening 101A. The drum cartridge 104 is detached from the image forming apparatus 100, for example, when replacement of the drum cartridge 104 is required.

As shown in FIG. 16, the drum cartridge 104 includes a photosensitive drum 1041, a charging roller 1042, a development unit 1043, and the transfer roller 1044.

4.1.4.1 Photosensitive Drum 1041

The photosensitive drum 1041 is rotatable about a drum axis A101. The drum axis A101 extends in the first direction. The photosensitive drum 1041 extends in the first direction. The photosensitive drum 1041 has a cylindrical shape.

4.1.4.2 Charging Roller 1042

The charging roller 1042 charges the photosensitive drum 1041. The image forming apparatus 100 may include a scorotron charger instead of the charging roller 1042.

4.1.4.3 Development Unit 1043

The development unit 1043 supplies toner to the photosensitive drum 1041. The development unit 1043 includes a development housing 1043A and a development roller 1043B.

The development housing 1043A is configured to store toner. The development housing 1043A supports the development roller 1043B.

The development roller 1043B supplies toner in the development housing 1043A to the photosensitive drum 1041. The development roller 1043B contacts the photosensitive drum 1041. The development roller 1043B may be separable from the photosensitive drum 1041. The development roller 1043B is rotatable about a development axis A102. The development axis A102 extends in the first direction.

4.1.4.4 Transfer Roller 1044

The transfer roller 1044 transfers the toner on the photosensitive drum 1041 onto the sheet S. Specifically, the sheet S from the sheet storage section 103 passes between the transfer roller 1044 and the photosensitive drum 1041. At this time, the transfer roller 1044 transfers the toner on the photosensitive drum 1041 onto the sheet S. The transfer roller 1044 contacts the photosensitive drum 1041.

4.1.5 Toner Cartridge 1

The toner cartridge 1 is attachable to and detachable from the drum cartridge 104. Specifically, the toner cartridge 1 is attachable to and detachable from the development unit 1043 of the drum cartridge 104. In a state where the toner cartridge 1 is attached to the drum cartridge 104, the toner cartridge 1 supplies toner to the development housing 1043A.

In a state where the toner cartridge 1 is attached to the drum cartridge 104, the drum cartridge 104 is attached to the image forming apparatus 100, and the image forming apparatus 100 is placed on a horizontal surface, the third direction is the same as the upper-lower direction. In a state where the toner cartridge 1 is attached to the drum cartridge 104, the drum cartridge 104 is attached to the image forming apparatus 100, and the image forming apparatus 100 is placed on a horizontal surface, one side in the third direction is the upper side and the other side in the third direction is the lower side. In a state where the toner cartridge 1 is attached to the drum cartridge 104, the drum cartridge 104 is attached to the image forming apparatus 100, and the image forming apparatus 100 is placed on a horizontal surface, the first direction and the second direction are horizontal directions.

4.1.6 Exposure Device 105

The exposure device 105 exposes the photosensitive drum 1041. Specifically, in a state where the drum cartridge 104 is attached to the main housing 101, the exposure device 105 exposes the surface of the photosensitive drum 1041 charged by the charging roller 1042. The development unit 1043 supplies toner to the exposed surface of the photosensitive drum 1041. In this embodiment, the exposure device 105 is a laser scanning unit. The exposure device 105 may be an LED head.

4.1.7 Fuser 106

The fuser 106 fixes the toner transferred on the sheet S onto the sheet S. In this embodiment, the fuser 106 fixes the toner onto the sheet S by heating and pressurizing the sheet S on which the toner has been transferred. The sheet S that has passed through the fuser 106 is discharged onto the upper surface of the main housing 101.

4.2 Details of Drum Cartridge 104

Figure 18:
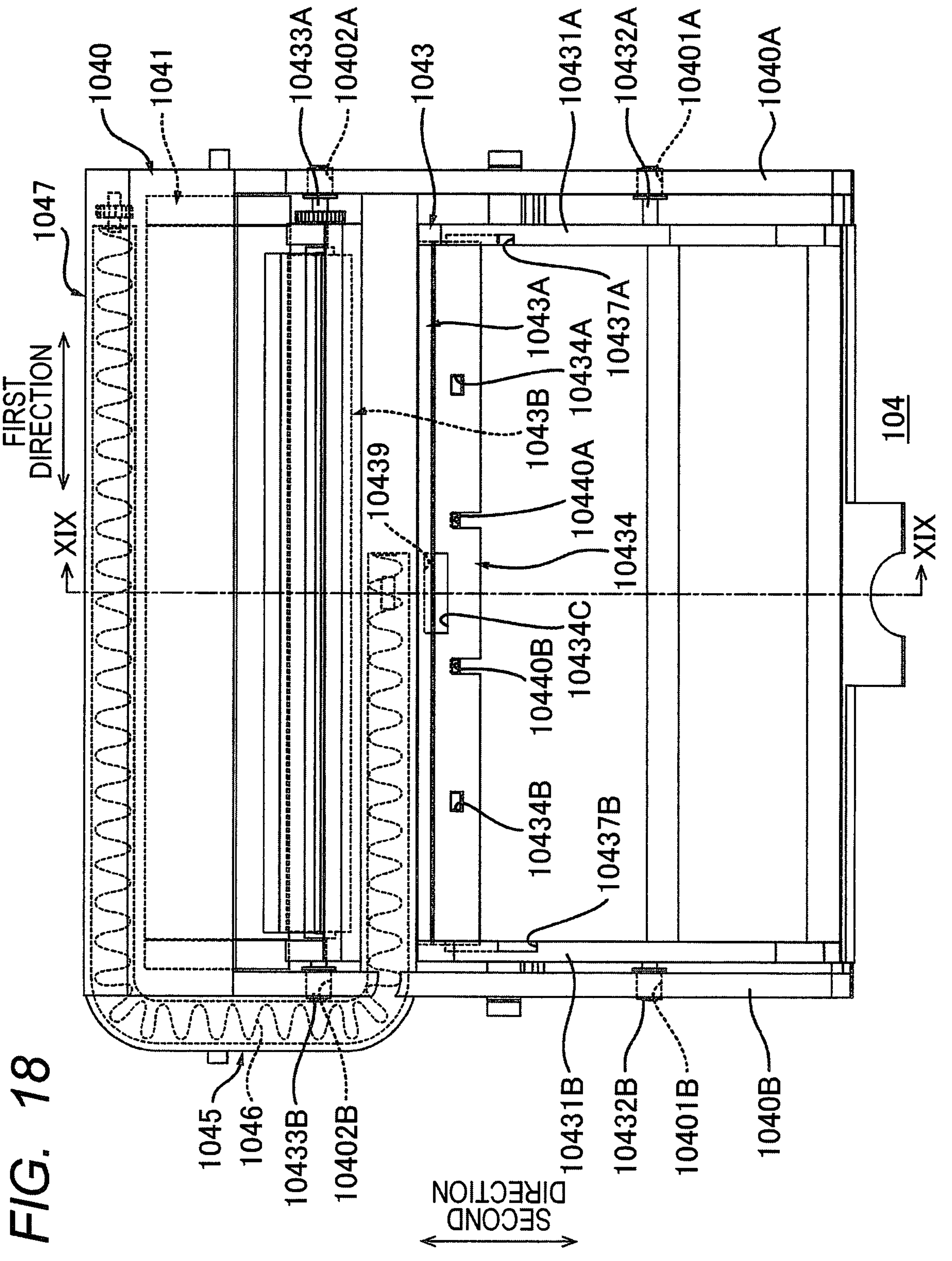
FIG. 18 is a plan view of the drum cartridge shown in FIG. 16.
Figure 19:
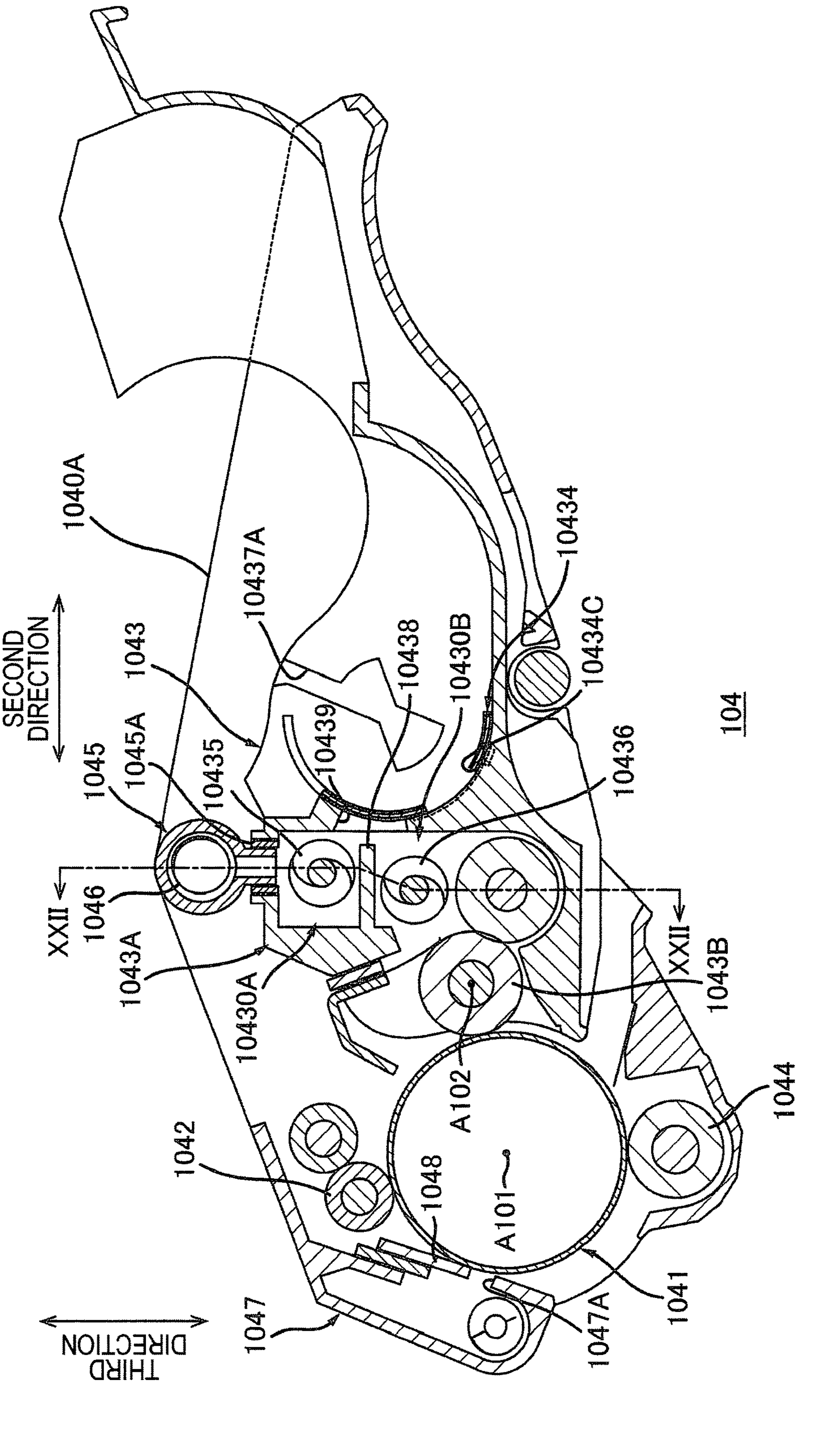
FIG. 19 is a cross-sectional view of the drum cartridge shown in FIG. 18, taken along a line XIX-XIX.

As shown in FIG. 18, the drum cartridge 104 includes a frame 1040, a waste toner pipe 1045, and a conveyance member 1046, in addition to the above-described photosensitive drum 1041, the charging roller 1042 (see FIG. 19), the development unit 1043, and the transfer roller 1044 (see FIG. 19).

4.2.1 Frame 1040

The frame 1040 supports the photosensitive drum 1041, the charging roller 1042, the development unit 1043, and the transfer roller 1044. The frame 1040 includes two drum side plates 1040A and 1040B, a waste toner storage portion 1047, and a drum cleaning member 1048 (see FIG. 19). In other words, the drum cartridge 104 includes the waste toner storage portion 1047 and the drum cleaning member 1048.

4.2.1.1 Drum Side Plates 1040A and 1040B

As shown in FIG. 18, the drum side plate 1040A is located at one end of the frame 1040 in the first direction. The drum side plate 1040A supports one end of the photosensitive drum 1041 and one end of the development unit 1043. The drum side plate 1040A extends in the second direction and the third direction.

The drum side plate 1040A has two through holes 10401A and 10402A.

Figure 20:
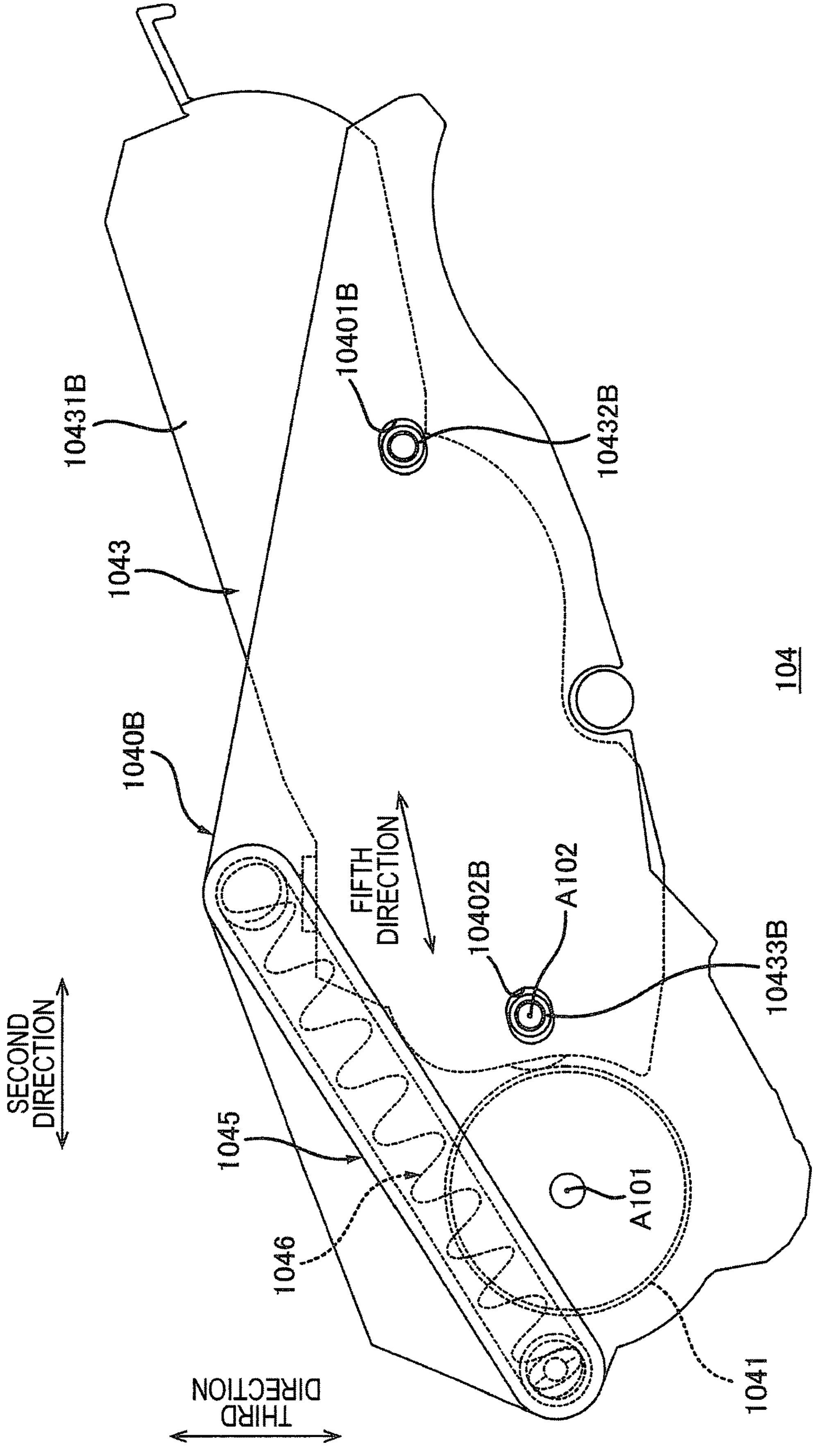
FIG. 20 is a side view of the drum cartridge shown in FIG. 18.

The through hole 10401A is located away from the photosensitive drum 1041 in a fifth direction (see FIG. 20). The fifth direction is the direction connecting the drum axis A101 and the development axis A102. The through hole 10401A extends in the fifth direction. The through hole 10401A is an elongated hole. A protrusion 10432A of the development unit 1043 fits into the through hole 10401A. The protrusion 10432A will be described later.

The through hole 10402A is located away from the through hole 10401A in the fifth direction. The through hole 10402A is located between the photosensitive drum 1041 and the through hole 10401A in the fifth direction. The through hole 10402A extends in the fifth direction. The through hole 10402A is an elongated hole. A protrusion 10433A of the development unit 1043 fits into the through hole 10402A. The protrusion 10433A will be described later.

The drum side plate 1040B is located at the other end of the frame 1040 in the first direction. The drum side plate 1040B is located away from the drum side plate 1040A in the first direction. The drum side plate 1040B extends in the second direction and the third direction. The drum side plate 1040B supports the other end of the photosensitive drum 1041 and the other end of the development unit 1043. The drum side plate 1040B has two through holes 10401B and 10402B.

As shown in FIG. 20, the through hole 10401B is located away from the photosensitive drum 1041 in the fifth direction. The through hole 10401B extends in the fifth direction. The through hole 10401B is an elongated hole. A protrusion 10432B of the development unit 1043 fits into the through hole 10401B. The protrusion 10432B will be described later.

The through hole 10402B is located away from the through hole 10401B in the fifth direction. The through hole 10402B is located between the photosensitive drum 1041 and the through hole 10401B in the fifth direction. The through hole 10402B extends in the fifth direction. The through hole 10402B is an elongated hole. A protrusion 10433B of the development unit 1043 fits into the through hole 10402B. The protrusion 10433B will be described later.

4.2.1.2 Waste Toner Storage Portion 1047

As shown in FIG. 18, the waste toner storage portion 1047 is located between the drum side plate 1040A and the drum side plate 1040B in the first direction. The waste toner storage portion 1047 extends in the first direction. One end of the waste toner storage portion 1047 in the first direction is connected to the drum side plate 1040A. The other end of the waste toner storage portion 1047 in the first direction is connected to the drum side plate 1040B. As shown in FIG. 19, the waste toner storage portion 1047 has an opening 1047A. The waste toner storage portion 1047 stores waste toner.

4.2.1.3 Drum Cleaning Member 1048

The drum cleaning member 1048 is attached to the waste toner storage portion 1047. The drum cleaning member 1048 extends in the first direction. The drum cleaning member 1048 has a plate shape. The drum cleaning member 1048 cleans the circumferential surface of the photosensitive drum 1041. Specifically, an edge of the drum cleaning member 1048 contacts the surface of the photosensitive drum 1041. As the photosensitive drum 1041 rotates, waste toner on the surface of the photosensitive drum 1041 contacts the edge of the drum cleaning member 1048 and is removed from the surface of the photosensitive drum 1041. The removed waste toner is stored in the waste toner storage portion 1047 through the opening 1047A.

4.2.2 Details of Development Unit 1043

As shown in FIG. 18, the development unit 1043 is located between the drum side plate 1040A and the drum side plate 1040B in the first direction. Specifically, the development housing 1043A is located between the drum side plate 1040A and the drum side plate 1040B in the first direction. The development unit 1043 includes two development side plates 10431A and 10431B, two protrusions 10432A and 10433A, two protrusions 10432B and 10433B, a development shutter 10434, a first screw 10435 (see FIG. 19), and a second screw 10436 (see FIG. 19), in addition to the development housing 1043A and the development roller 1043B described above.

4.2.2.1 Development Side Plates 10431A and 10431B

Figure 21:
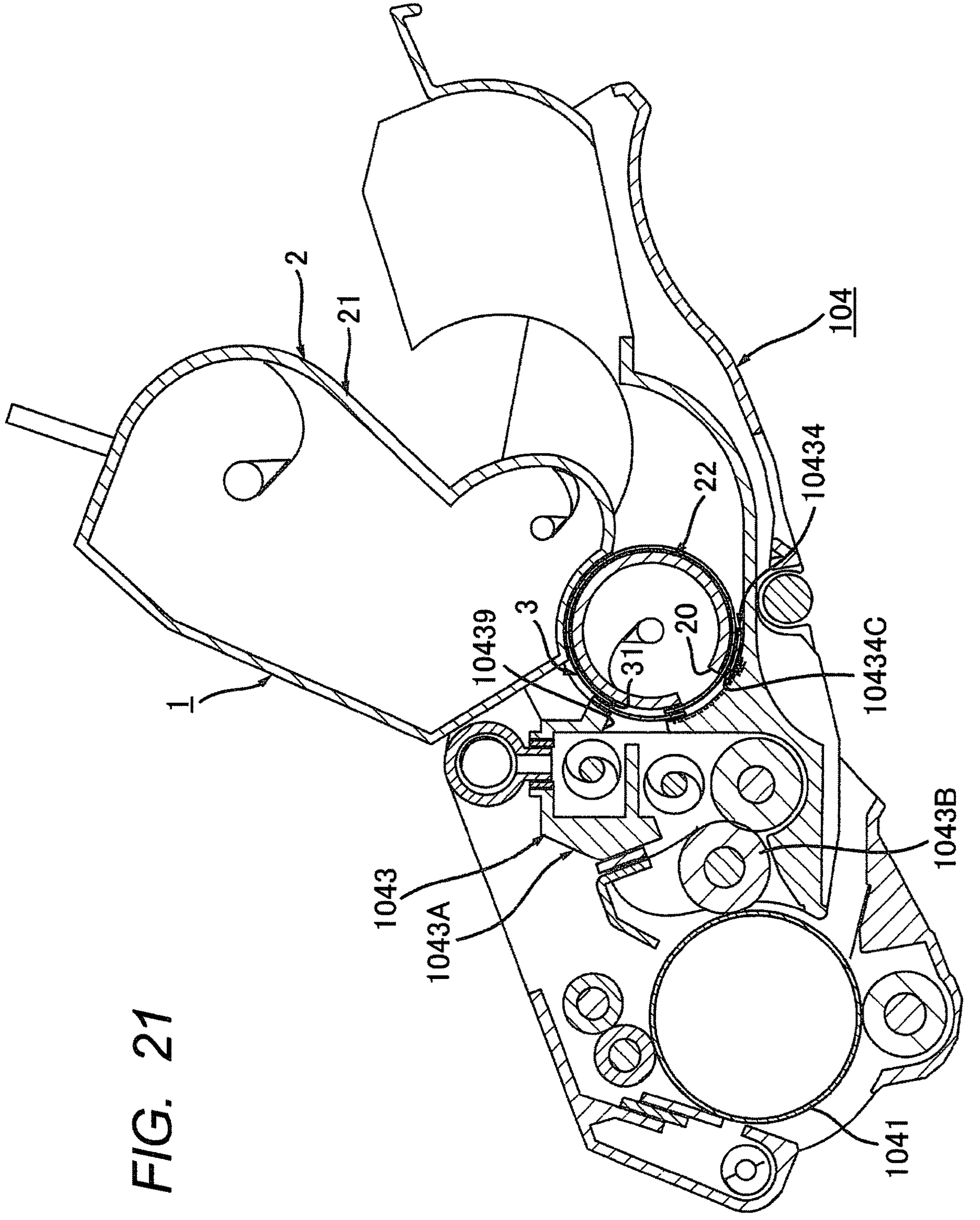
FIG. 21 shows a state where a second storage portion of the toner cartridge is supported by a drum cartridge, the discharge shutter is located at a discharge shutter closed position, and a development shutter is located at a development shutter closed position.

The development side plate 10431A is located at one end of the development unit 1043 in the first direction. The development side plate 10431A supports one end of the development roller 1043B. The development side plate 10431A extends in the second direction and the third direction. The development side plate 10431A has a groove 10437A. As shown in FIG. 21, when the toner cartridge 1 is attached to the drum cartridge 104, the groove 10437A (see FIG. 18) receives the rib 24A (see FIG. 1) of the toner cartridge 1.

As shown in FIG. 18, the development side plate 10431B is located at the other end of the development unit 1043 in the first direction. The development side plate 10431B is located away from the development side plate 10431A in the first direction. The development side plate 10431B supports the other end of the development roller 1043B. The development side plate 10431B extends in the second direction and the third direction. The development side plate 10431B has a groove 10437B. As shown in FIG. 21, when the toner cartridge 1 is attached to the drum cartridge 104, the groove 10437B (see FIG. 18) receives the rib 24B (see FIG. 1) of the toner cartridge 1.

4.2.2.2 Details of Development Housing 1043A

As shown in FIG. 18, the development housing 1043A is located between the development side plate 10431A and the development side plate 10431B in the first direction. The development housing 1043A extends in the first direction. One end of the development housing 1043A in the first direction is connected to the development side plate 10431A. The other end of the development housing 1043A in the first direction is connected to the development side plate 10431B. As shown in FIG. 19, the development housing 1043A has a partition wall 10438. The development housing 1043A has a development reception port 10439 and two recesses 10440A and 10440B (see FIG. 18).

Figure 22:
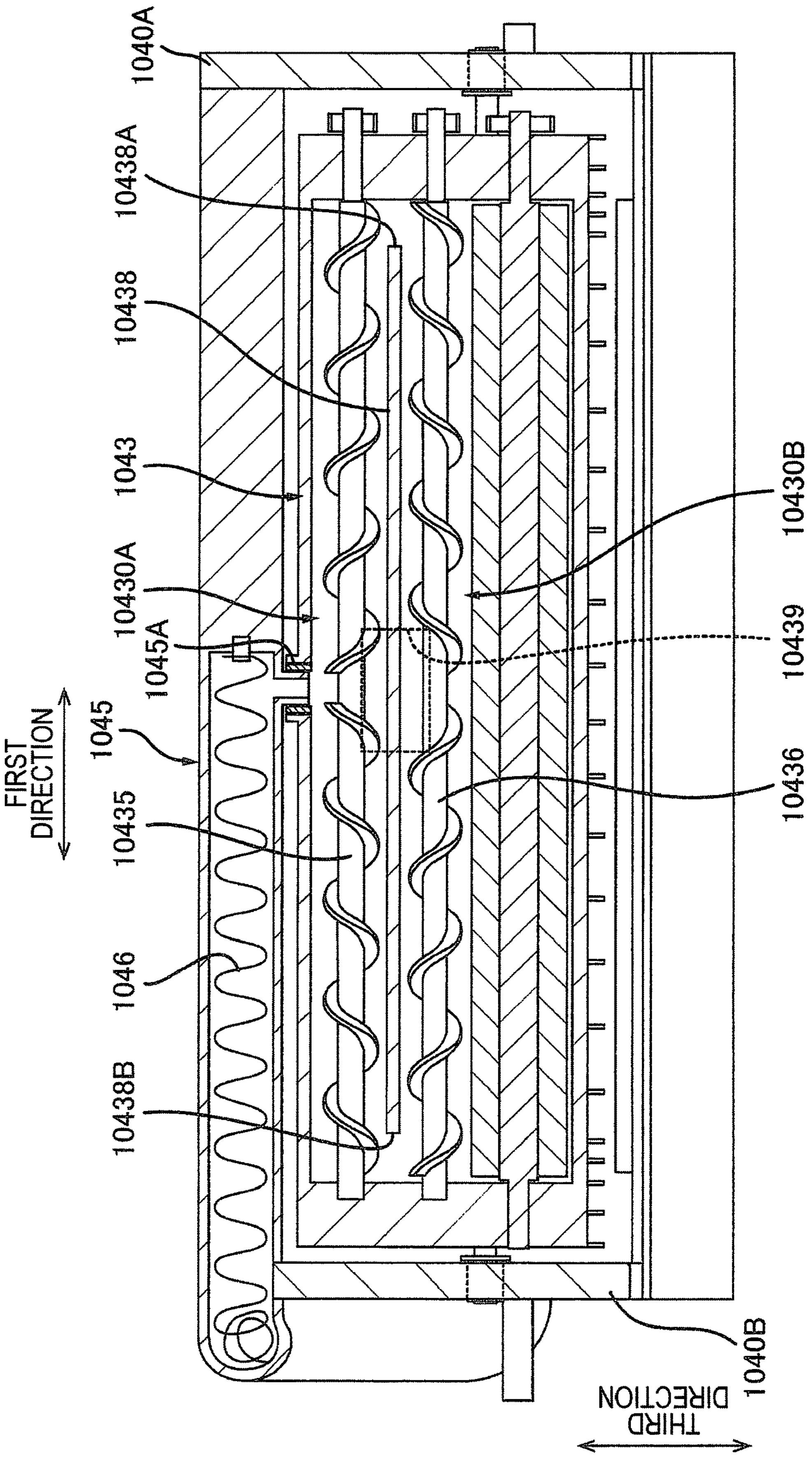
FIG. 22 is a cross-sectional view of the drum cartridge shown in FIG. 19, taken along a line XXII-XXII.

The partition wall 10438 is located inside the development housing 1043A. The partition wall 10438 partitions the internal space of the development housing 1043A into a first development chamber 10430A and a second development chamber 10430B. The first development chamber 10430A is located on one side of the second development chamber 10430B in the third direction. A part of the development roller 1043B is located inside the second development chamber 10430B. The development roller 1043B supplies the toner in the second development chamber 10430B to the photosensitive drum 1041. As shown in FIG. 22, the partition wall 10438 extends in the first direction. The partition wall 10438 has two passages 10438A and 10438B.

The passage 10438A is located at one end of the partition wall 10438 in the first direction. The passage 10438A allows communication between the first development chamber 10430A and the second development chamber 10430B.

The passage 10438B is located at the other end of the partition wall 10438 in the first direction. The passage 10438B allows communication between the first development chamber 10430A and the second development chamber 10430B.

As shown in FIG. 18, the development reception port 10439 is located at a center portion of the development housing 1043A in the first direction. The development reception port 10439 is located between the recess 10440A and the recess 10440B in the first direction. In a state where the toner cartridge 1 is attached to the drum cartridge 104, the development reception port 10439 receives toner from the toner cartridge 1. As shown in FIGS. 19 and 22, the development reception port 10439 overlaps the partition wall 10438 in the second direction.

As shown in FIG. 18, the recess 10440A is located between the development reception port 10439 and the development side plate 10431A in the first direction.

The recess 10440B is located between the development reception port 10439 and the development side plate 10431B in the first direction. The recess 10440B is located on the opposite side of the recess 10440A with respect to the development reception port 10439 in the first direction.

As shown in FIG. 21, when the toner cartridge 1 is attached to the drum cartridge 104 in a state where the discharge shutter 3 of the toner cartridge 1 is located at the discharge shutter closed position (see FIG. 1), the protrusion 32A (see FIG. 1) of the discharge shutter 3 of the toner cartridge 1 fits into the recess 10440A (see FIG. 18), and the protrusion 32B (see FIG. 1) of the discharge shutter 3 of the toner cartridge 1 fits into the recess 10440B (see FIG. 18). Thus, the discharge shutter 3 of the toner cartridge 1 is fixed to the development housing 1043A.

Figure 23:
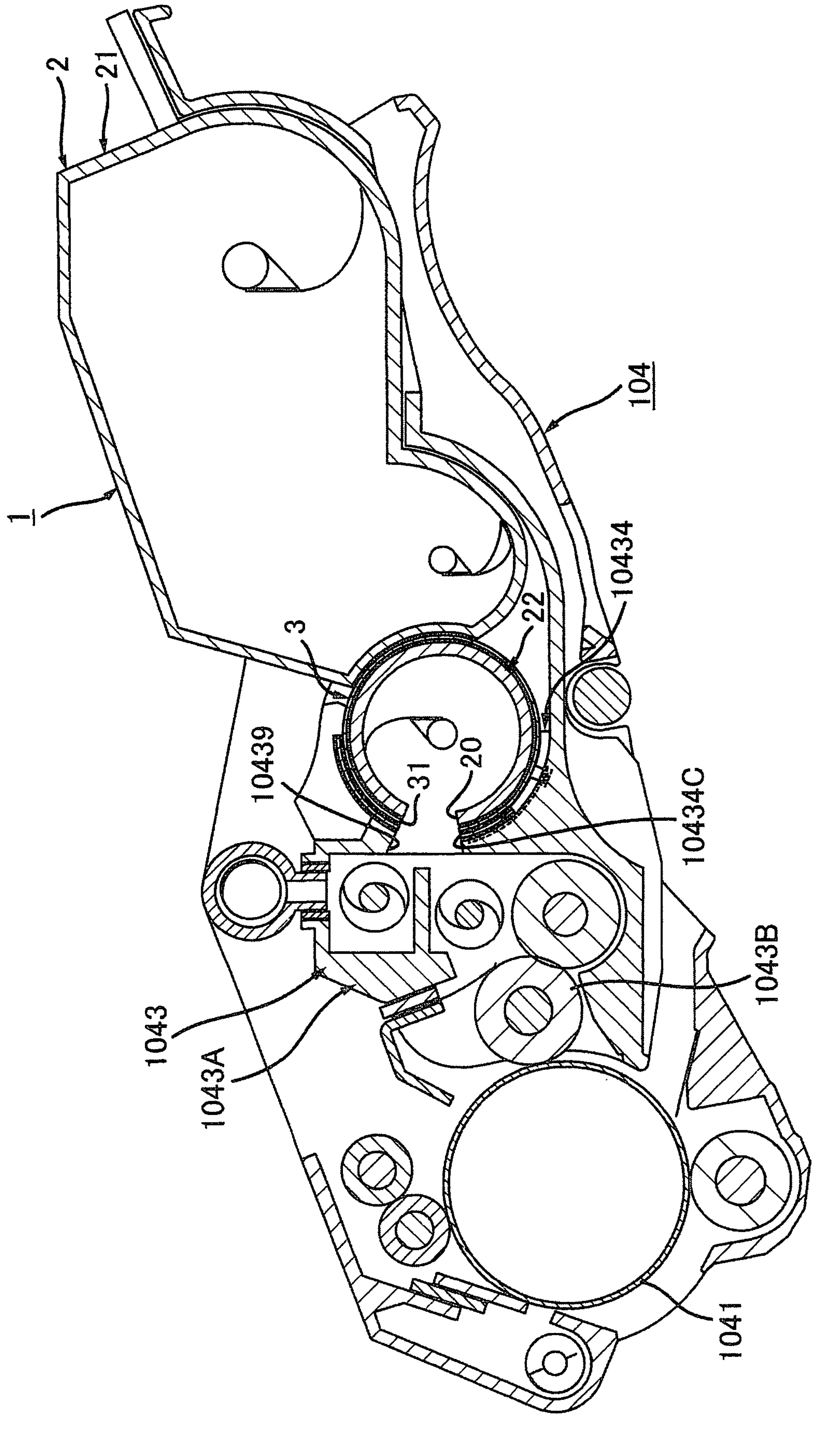
FIG. 23 shows a state where a toner housing is rotated about the second storage portion, the discharge shutter is located at the discharge shutter open position, and the development shutter is located at the development shutter open position, continuing from FIG. 21.

Then, as shown in FIGS. 21 and 23, when the toner housing 2 of the toner cartridge 1 is rotated about the second storage portion 22 in a state where the discharge shutter 3 is fixed to the development housing 1043A, the toner housing 2 rotates relative to the discharge shutter 3. As a result, the discharge shutter 3 moves from the discharge shutter closed position to the discharge shutter open position relative to the second storage portion 22 of the toner housing 2.

4.2.2.3 Protrusions 10432A and 10433A

As shown in FIG. 18, the protrusion 10432A is located away from the photosensitive drum 1041 in the fifth direction (see FIG. 20). The protrusion 10432A is located at one end of the development unit 1043 in the first direction. The protrusion 10432A extends in the first direction from the development side plate 10431A. The protrusion 10432A has a cylindrical shape. The protrusion 10432A fits into the through hole 10401A of the drum side plate 1040A.

The protrusion 10433A is located between the photosensitive drum 1041 and the protrusion 10432A in the fifth direction. The protrusion 10433A is located at one end of the development unit 1043 in the first direction. The protrusion 10433A extends in the first direction from the development side plate 10431A. The protrusion 10433A has a cylindrical shape. The protrusion 10433A may be one end of a shaft of the development roller 1043B. The protrusion 10433A fits into the through hole 10402A of the drum side plate 1040A.

4.2.2.4 Protrusions 10432B and 10433B

The protrusion 10432B is located away from the photosensitive drum 1041 in the fifth direction. The protrusion 10432B is located at the other end of the development unit 1043 in the first direction. The protrusion 10432B extends in the first direction from the development side plate 10431B. The protrusion 10432B has a cylindrical shape. The protrusion 10432B fits into the through hole 10401B of the drum side plate 1040B.

The protrusion 10433B is located between the photosensitive drum 1041 and the protrusion 10432B in the fifth direction. The protrusion 10433B is located at the other end of the development unit 1043 in the first direction. The protrusion 10433B extends in the first direction from the development side plate 10431B. The protrusion 10433B has a cylindrical shape. The protrusion 10433B may be the other end of the shaft of the development roller 1043B. The protrusion 10433B fits into the through hole 10402B of the drum side plate 1040B.

In a state where the protrusion 10432A fits into the through hole 10401A of the drum side plate 1040A, the protrusion 10433A fits into the through hole 10402A of the drum side plate 1040A, the protrusion 10432B fits into the through hole 10401B of the drum side plate 1040B, and the protrusion 10433B fits into the through hole 10402B of the drum side plate 1040B, the development unit 1043 is movable in the fifth direction relative to the photosensitive drum 1041.

4.2.2.5 Development Shutter 10434

As shown in FIG. 18, the development shutter 10434 is located between the development side plate 10431A and the development side plate 10431B in the first direction. The development shutter 10434 extends in the first direction. The development shutter 10434 opens and closes the development reception port 10439. The development shutter 10434 has two through holes 10434A, 10434B and an opening 10434C.

The through hole 10434A is located between the recess 10440A of the development housing 1043A and the development side plate 10431A in the first direction.

The through hole 10434B is located between the recess 10440B of the development housing 1043A and the development side plate 10431B in the first direction.

The opening 10434C is located at a center portion of the development shutter 10434 in the first direction. The opening 10434C is located between the through hole 10434A and the through hole 10434B in the first direction.

As shown in FIG. 21, when the toner cartridge 1 is attached to the drum cartridge 104, the protrusion 25A (see FIG. 1) of the toner housing 2 of the toner cartridge 1 fits into the through hole 10434A (see FIG. 18), and the protrusion 25B (see FIG. 1) of the toner housing 2 of the toner cartridge 1 fits into the through hole 10434B (see FIG. 18). Thereby, the development shutter 10434 is fixed to the toner housing 2 of the toner cartridge 1.

Then, as shown in FIGS. 21 and 23, when the toner housing 2 of the toner cartridge 1 is rotated about the second storage portion 22 in a state where the development shutter 10434 is fixed to the toner housing 2, the development shutter 10434 moves together with the toner housing 2 from the development shutter closed position (see FIG. 21) to the development shutter open position (see FIG. 23).

As shown in FIG. 21, in a state where the development shutter 10434 is located at the development shutter closed position, the development shutter 10434 closes the development reception port 10439. In a state where the development shutter 10434 is located at the development shutter closed position, the opening 10434C of the development shutter 10434 is located away from the development reception port 10439.

As shown in FIG. 23, in a state where the development shutter 10434 is located at the development shutter open position, at least part of the opening 10434C of the development shutter 10434 overlaps the development reception port 10439. Thus, in a state where the development shutter 10434 is located at the development shutter open position, the development shutter 10434 opens the development reception port 10439.

4.2.2.6 First Screw 10435

As shown in FIGS. 19 and 22, the first screw 10435 is located inside the first development chamber 10430A of the development housing 1043A. The first screw 10435 conveys the toner in the first development chamber 10430A toward the development reception port 10439 in the first direction. The first screw 10435 extends in the first direction. The first screw 10435 is an auger screw.

4.2.2.7 Second Screw 10436

The second screw 10436 is located inside the second development chamber 10430B of the development housing 1043A. The second screw 10436 conveys toner in the second development chamber 10430B toward the passages 10438A and 10438B in the first direction. The second screw 10436 extends in the first direction. The second screw 10436 is an auger screw.

4.2.3 Waste Toner Pipe 1045

As shown in FIG. 18, one end of the waste toner pipe 1045 is connected to the waste toner storage portion 1047. The other end of the waste toner pipe 1045 is connected to a center portion of the development housing 1043A in the first direction via a seal member 1045A (see FIG. 19). As shown in FIG. 19, the seal member 1045A is located between the other end of the waste toner pipe 1045 and the development housing 1043A. The seal member 1045A seals between the other end of the waste toner pipe 1045 and the development housing 1043A. The other end of the waste toner pipe 1045 communicates with the first development chamber 10430A. The waste toner in the waste toner storage portion 1047 enters the development housing 1043A through the waste toner pipe 1045.

4.2.4 Conveyance Member 1046

As shown in FIG. 18, the conveyance member 1046 is located inside the waste toner storage portion 1047 and the waste toner pipe 1045. The conveyance member 1046 conveys waste toner in the waste toner storage portion 1047 toward the development housing 1043A. The conveyance member 1046 is a shaftless screw.

5. Operations and Effects (1) According to the toner cartridge 1, as shown in FIG. 10, toner is supplied from the reception portion 23 located on the end surface S1 in the first direction of the toner housing 2 extending in the first direction.

Thus, as shown in FIG. 11, by supplying toner into the toner housing 2 in a state where one end of the toner housing 2 in the first direction faces upward, the supplied toner is distributed in the first direction by gravity inside the toner housing 2.

Further, as shown in FIG. 1, by shaking the toner cartridge 1 in a state where the reception shutter 4 is located at the reception shutter closed position, the toner supplied in the toner housing 2 is made uniform in the first direction.

Thus, the toner is smoothly supplied without requiring time for the supplied toner to spread over the entirety of the toner housing 2.

Further, even if there is no member for conveying the supplied toner in the toner housing 2 in the first direction, the supplied toner is distributed over the entirety of the toner housing 2.

Further, as shown in FIG. 1, the discharge port 20 is located on the surface S3 crossing the end surface S1.

This suppresses the toner moving toward the discharge port 20 when the toner supplied from the reception portion 23 located at the end surface S1 flows in the first direction.

As a result, spilling of the supplied toner from the discharge port 20 is suppressed.

(2) According to the toner cartridge 1, as shown in FIG. 10, the reception portion 23 is connectable to the toner container 10.

Thus, as shown in FIG. 11, the toner in the toner container 10 is supplied to the toner housing 2 in a state where the toner container 10 is connected to the reception portion 23 of the toner cartridge 1.

This suppresses spilling of the toner supplied from the toner container 10 to the toner housing 2.

(3) According to the toner cartridge 1, as shown in FIG. 3, the toner housing 2 has the first storage chamber 21A and the second storage chamber 22A. The first storage chamber 21A is located away from the discharge port 20. The reception ports 231A and 231B (see FIG. 4) communicate with the first storage chamber 21A.

With this configuration, the toner supplied through the reception ports 231A and 231B is stored in the first storage chamber 21A located away from the discharge port 20.

The second storage chamber 22A is located between the first storage chamber 21A and the discharge port 20. The discharge port 20 communicates with the second storage chamber 22A.

Thus, the movement of the supplied toner to the discharge port 20 is suppressed by the second storage chamber 22A.

As a result, spilling of the supplied toner from the discharge port 20 is further suppressed.

(4) According to the toner cartridge 1, as shown in FIG. 10, in a state where the toner container 10 is connected to the reception portion 23 and the reception shutter 4 is located at the reception shutter open position, the toner container 10 is undetachable from the toner cartridge 1.

Thus, in a state where the toner container 10 is connected to the reception portion 23 and the reception shutter 4 is located at the reception shutter open position, as shown in FIG. 11, even if the attitude of the toner cartridge 1 is changed and shaken, the toner container 10 does not come off from the toner cartridge 1.

Thus, in a state where the toner container 10 is connected to the reception portion 23 of the toner cartridge 1, the attitude of the toner cartridge 1 may be changed, and all the toner in the toner container 10 may be supplied to the toner housing 2 while shaking the toner cartridge 1.

(5) According to the toner cartridge 1, as shown in FIG. 8, the toner container 10 includes the container main body 11 and the container shutter 12.

As shown in FIG. 14, in a state where the toner container 10 is connected to the reception portion 23 and the reception shutter 4 is located at the reception shutter closed position, the container shutter 12 closes the discharge ports 110A and 110B of the container main body 11.

As shown in FIG. 15, in a state where the toner container 10 is connected to the reception portion 23 and the reception shutter 4 is located at the reception shutter open position, the container shutter 12 opens the discharge ports 110A and 110B of the container main body 11.

That is, in a state where the toner container 10 is connected to the reception portion 23, the container shutter 12 is also opened by an operation of moving the reception shutter 4 from the reception shutter closed position to the reception shutter open position.

Thus, compared to the case where the toner container 10 is connected to the reception portion 23 in a state where the discharge ports 110A and 110B of the toner container 10 are open, spilling of the toner in the toner container 10 is suppressed when the toner container 10 is connected to the reception portion 23.

(6) According to the method of supplying toner, as shown in FIG. 9, first, in a state where the reception shutter 4 is located at the reception shutter closed position, the toner container 10 is connected to the toner cartridge 1 (connecting step). Next, as shown in FIGS. 10 and 15, in a state where the toner container 10 is connected to the reception portion 23, the reception shutter 4 is moved from the reception shutter closed position to the reception shutter open position. Next, as shown in FIG. 11, in a state where the toner container 10 is connected to the reception portion 23 and the reception shutter 4 is located at the reception shutter open position, the toner container 10 is located above the toner cartridge 1 and the toner in the toner container 10 is supplied into the toner housing 2.

With this method, while suppressing spilling of the toner in the toner container 10, the toner in the toner container 10 is smoothly supplied to the toner cartridge 1 by using gravity.

If the toner container 10 is to be connected to the toner cartridge 1 in a state where one end of the toner housing 2 faces upward in the first direction, there is a possibility that toner spills out when the toner container 10 is connected to the toner cartridge 1.

In this regard, as shown in FIG. 11, the toner container 10 is placed above the toner cartridge 1 in a state where the toner container 10 is connected to the reception portion 23 and the reception shutter 4 is located at the reception shutter open position.

This suppresses spilling of toner when the toner container 10 and the toner cartridge 1 are connected.

6. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

Modifications will be described with reference to FIGS. 24 to 33. In the modifications, members similar to those of the embodiment described above are denoted by the same reference numerals, and descriptions thereof are omitted.

Figure 24:
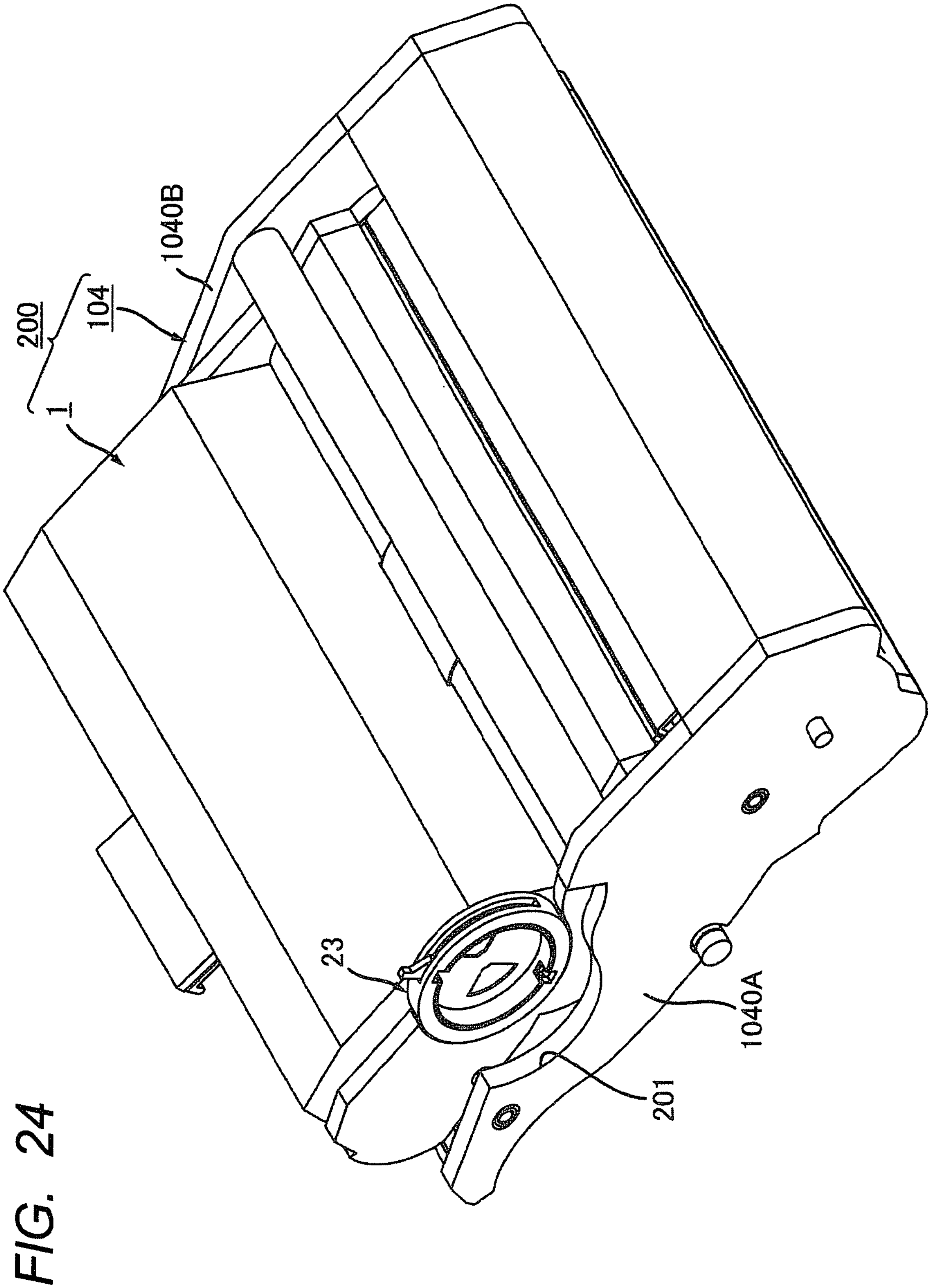
FIG. 24 is a perspective view of a process cartridge.
Figure 25:
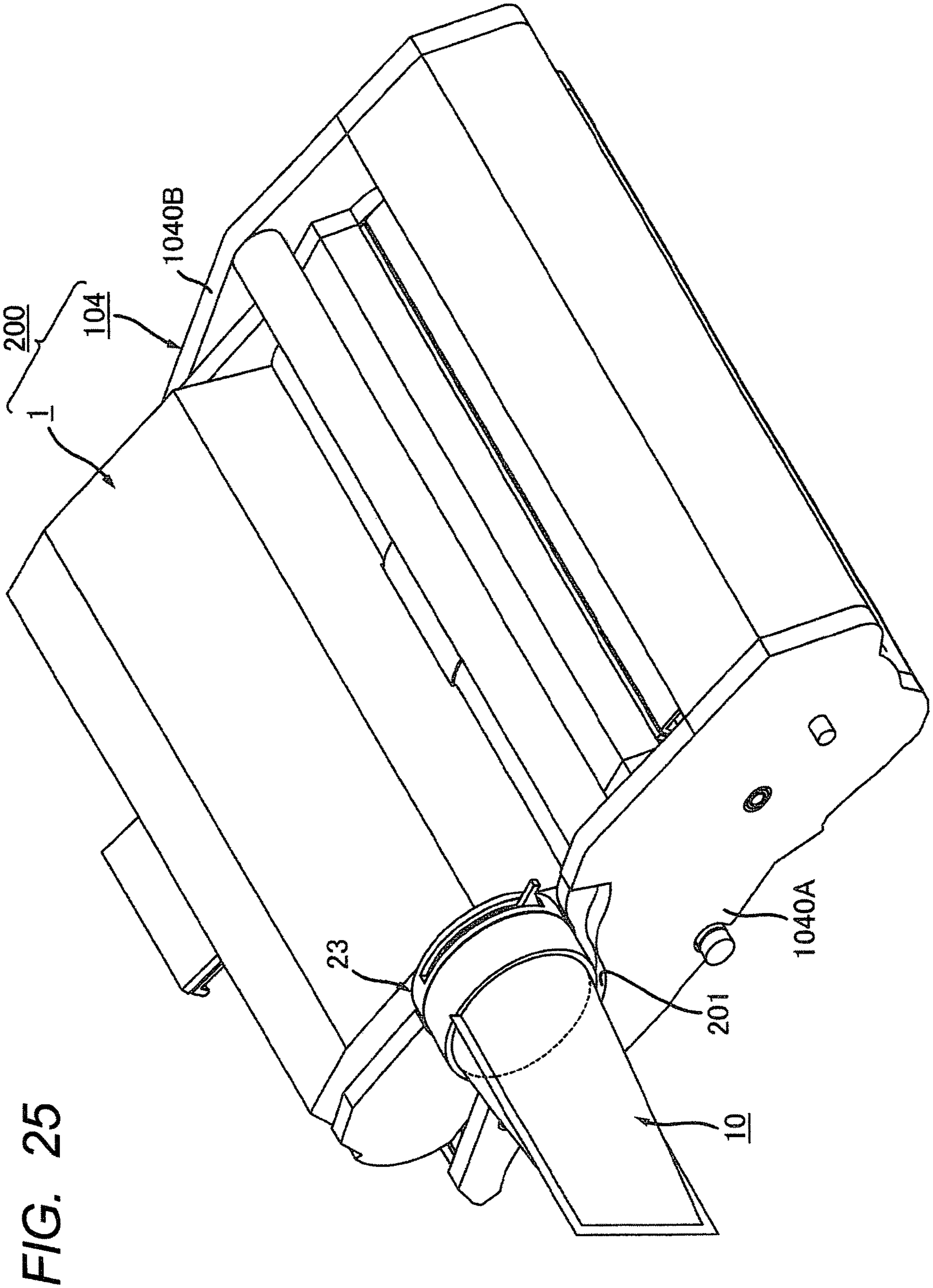
FIG. 25 shows a state where a toner container is connected to the process cartridge shown in FIG. 24.

(1) As shown in FIG. 24, the cartridge may be a process cartridge 200. The process cartridge 200 is composed of the toner cartridge 1 and the drum cartridge 104 by attaching the toner cartridge 1 to the drum cartridge 104. That is, the cartridge further includes the photosensitive drum 1041. As shown in FIG. 25, the toner container 10 may be connectable to the reception portion 23 of the toner cartridge 1 in a state where the toner cartridge 1 is attached to the drum cartridge 104. In this case, the drum side plate 1040A of the drum cartridge 104 may have a concave portion 201 configured to receive the toner container 10 connected to the reception portion 23 of the toner cartridge 1.

Figure 26:
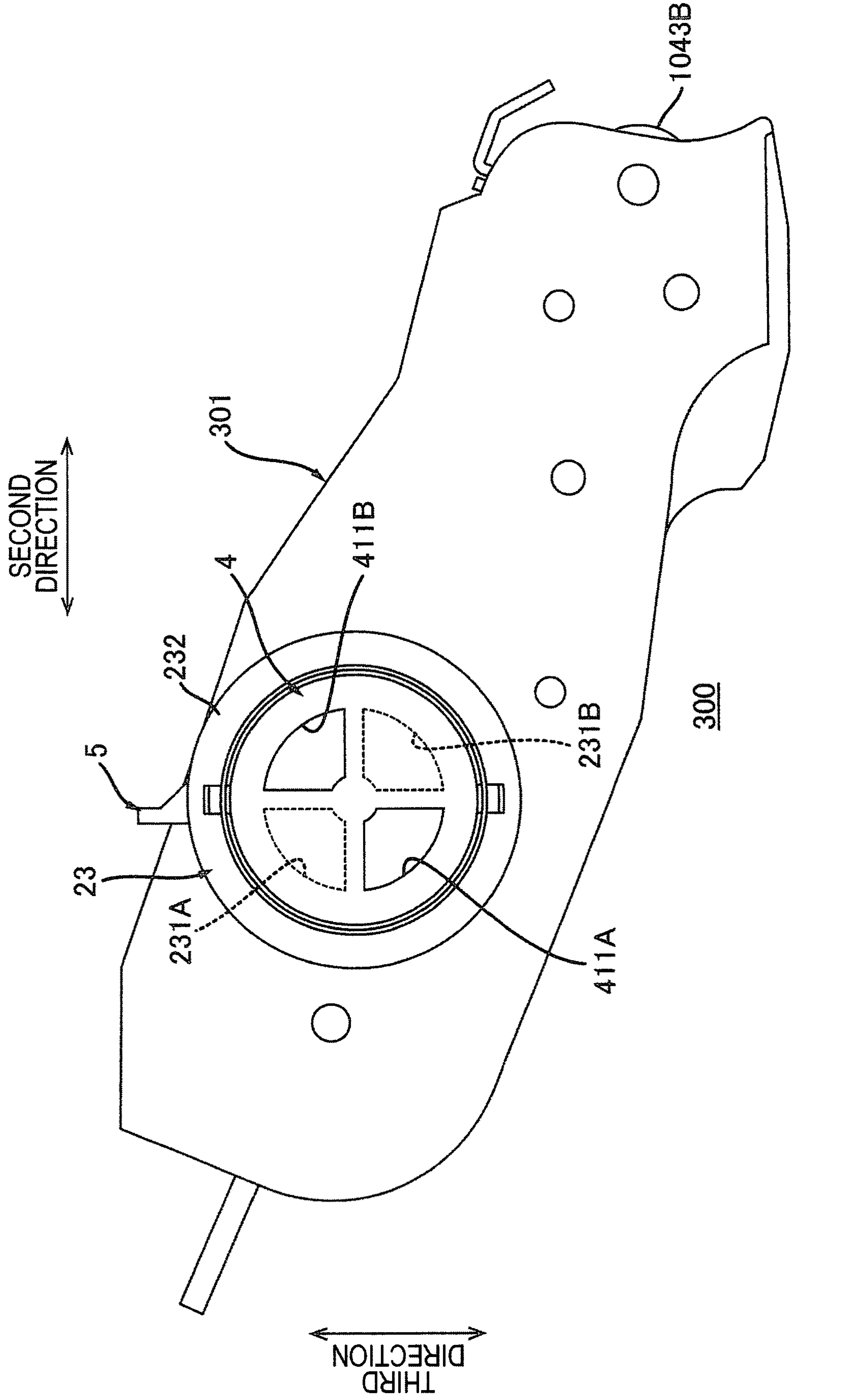
FIG. 26 is a side view of a development cartridge.
Figure 27:
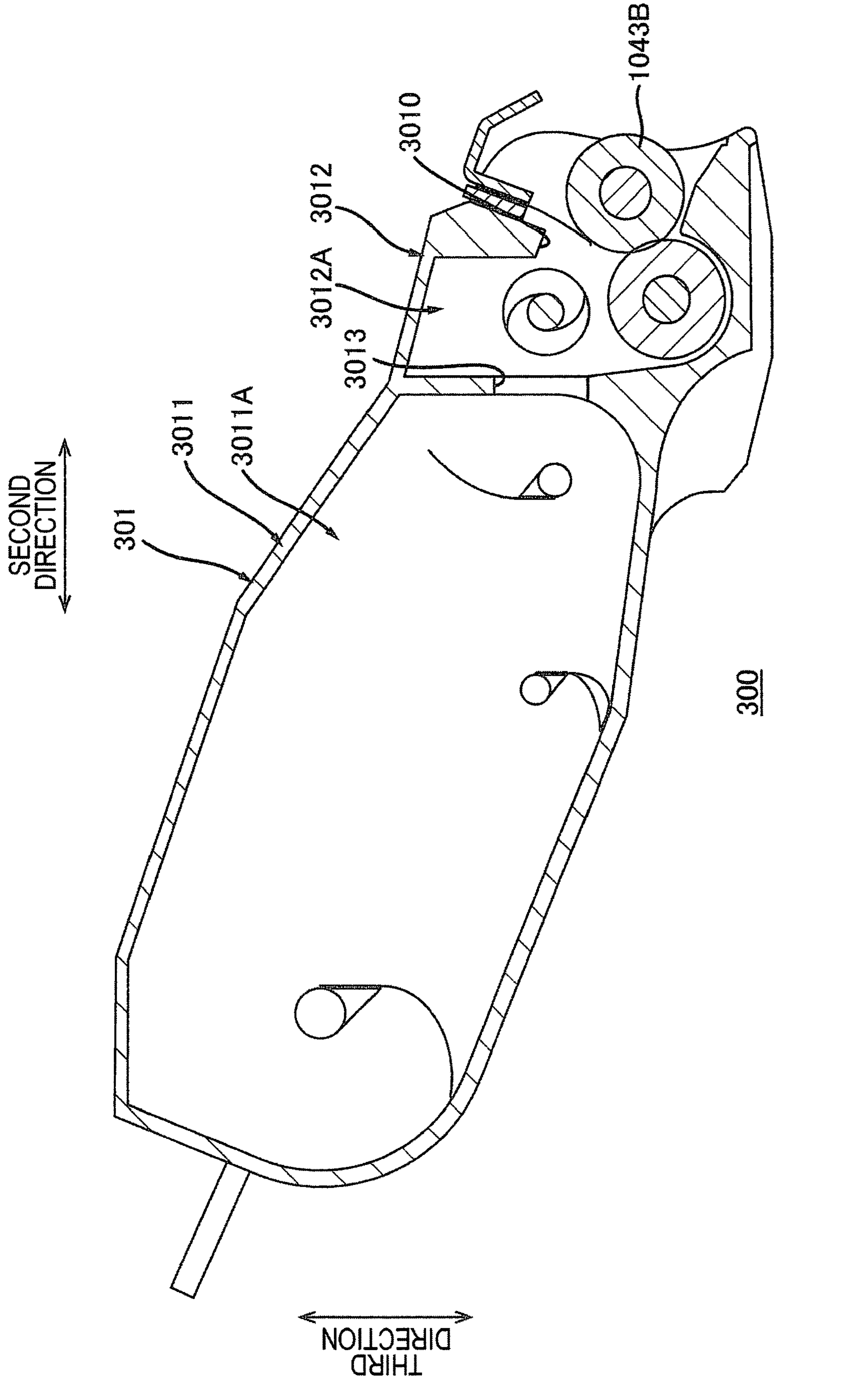
FIG. 27 is a cross-sectional view of the development cartridge shown in FIG. 26.

(2) As shown in FIG. 26, the cartridge may be a development cartridge 300. As shown in FIG. 27, the development cartridge 300 includes a toner housing 301 and a development roller 1043B. That is, the cartridge includes the development roller 1043B.

The toner housing 301 has a discharge port 3010. The discharge port 3010 is located at one end of the toner housing 301 in the second direction. As the development roller 1043B rotates, the toner in the toner housing 301 is discharged to outside the toner housing 301 through the discharge port 3010. That is, in a state where the development roller 1043B is rotating, the toner in the toner housing 301 is discharged through the discharge port 3010.

Specifically, the toner housing 301 has a first storage portion 3011, a second storage portion 3012, and the reception portion 23 (see FIG. 26).

The first storage portion 3011 is located away from the discharge port 3010 in the second direction. The first storage portion 3011 has a first storage chamber 3011A. In other words, the toner housing 301 has the first storage chamber 3011A.

The first storage chamber 3011A is an internal space of the first storage portion 3011. The first storage portion 3011 stores toner in the first storage chamber 3011A. The first storage chamber 3011A is located away from the discharge port 3010 in the second direction. The volume of the first storage chamber 3011A is larger than the volume of a second storage chamber 3012A of the second storage portion 3012. The second storage chamber 3012A will be described later.

The second storage portion 3012 is located at one end of the toner housing 301 in the second direction. The second storage portion 3012 is connected to one end of the first storage portion 3011 in the second direction. The second storage portion 3012 has the second storage chamber 3012A and the discharge port 3010 described above. In other words, the toner housing 301 has the second storage chamber 3012A.

The second storage chamber 3012A is an internal space of the second storage portion 3012. The second storage portion 3012 stores toner in the second storage chamber 3012A. The second storage chamber 3012A is located between the first storage chamber 3011A and the discharge port 3010 in the second direction. The second storage chamber 3012A communicates with the first storage chamber 3011A through a passage 3013. The volume of the second storage chamber 3012A is smaller than the volume of the first storage chamber 3011A of the first storage portion 3011. The discharge port 3010 communicates with the second storage chamber 3012A.

The development roller 1043B is supported at one end of the toner housing 301 in the second direction. A part of the development roller 1043B is located inside the discharge port 3010.

Figure 28:
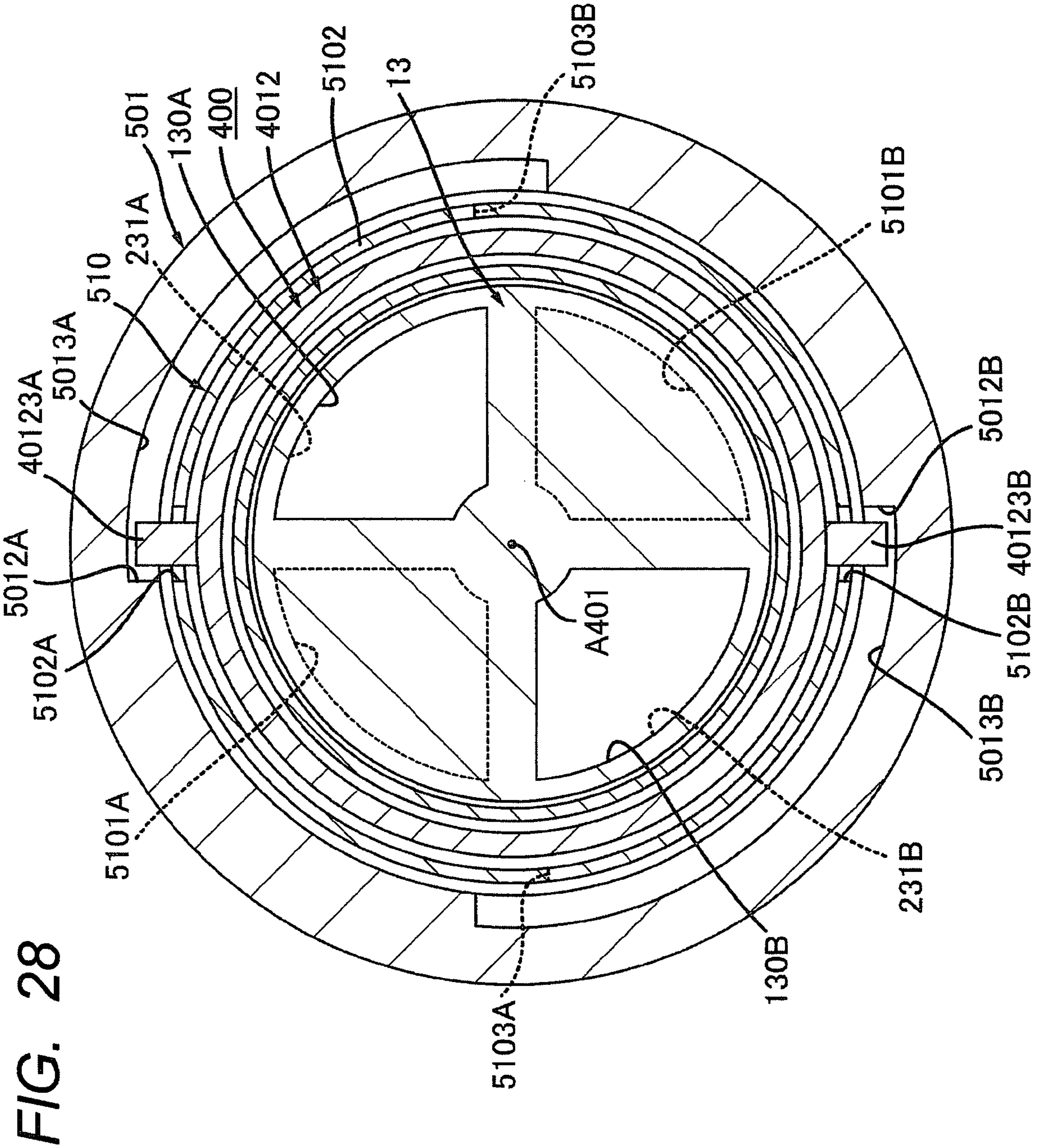
FIG. 28 is a cross-sectional view of a reception portion to which a toner container is connected (a cross-sectional view corresponding to a line XXVIII-XXVIII in FIG. 33), showing a state where a reception shutter is located at a reception shutter closed position and a container shutter is located at a container shutter closed position.
Figure 29:
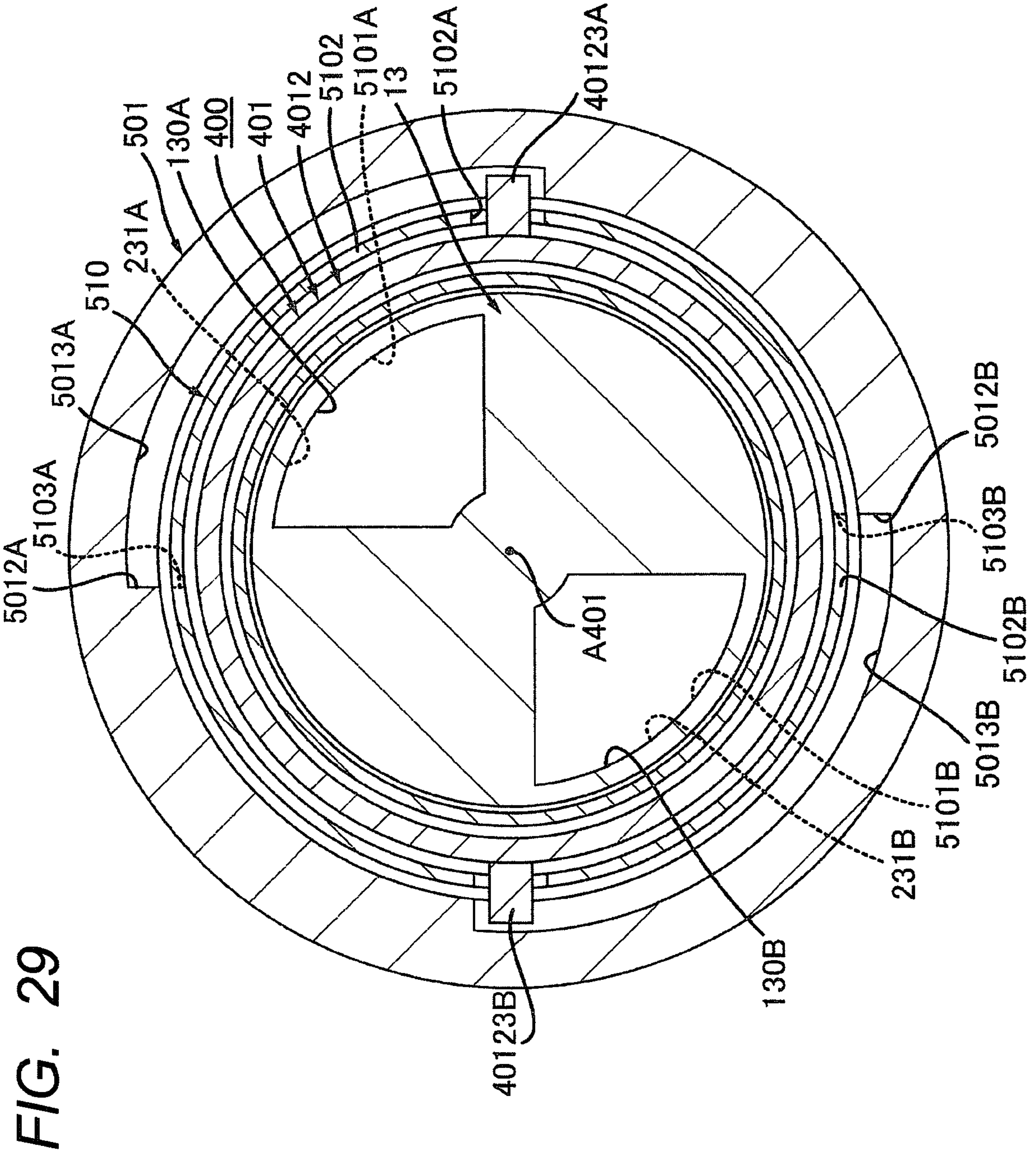
FIG. 29 is a cross-sectional view corresponding to FIG. 28, showing a state where the reception shutter is located at a reception shutter open position and the container shutter is located at a container shutter open position.

(3) As shown in FIGS. 28 and 29, in a state where a toner container 400 is connected to a reception portion 501, a reception shutter 510 may be rotatable together with the toner container 400 between a reception shutter closed position (see FIG. 28) and a reception shutter open position (see FIG. 29).

Figure 30:
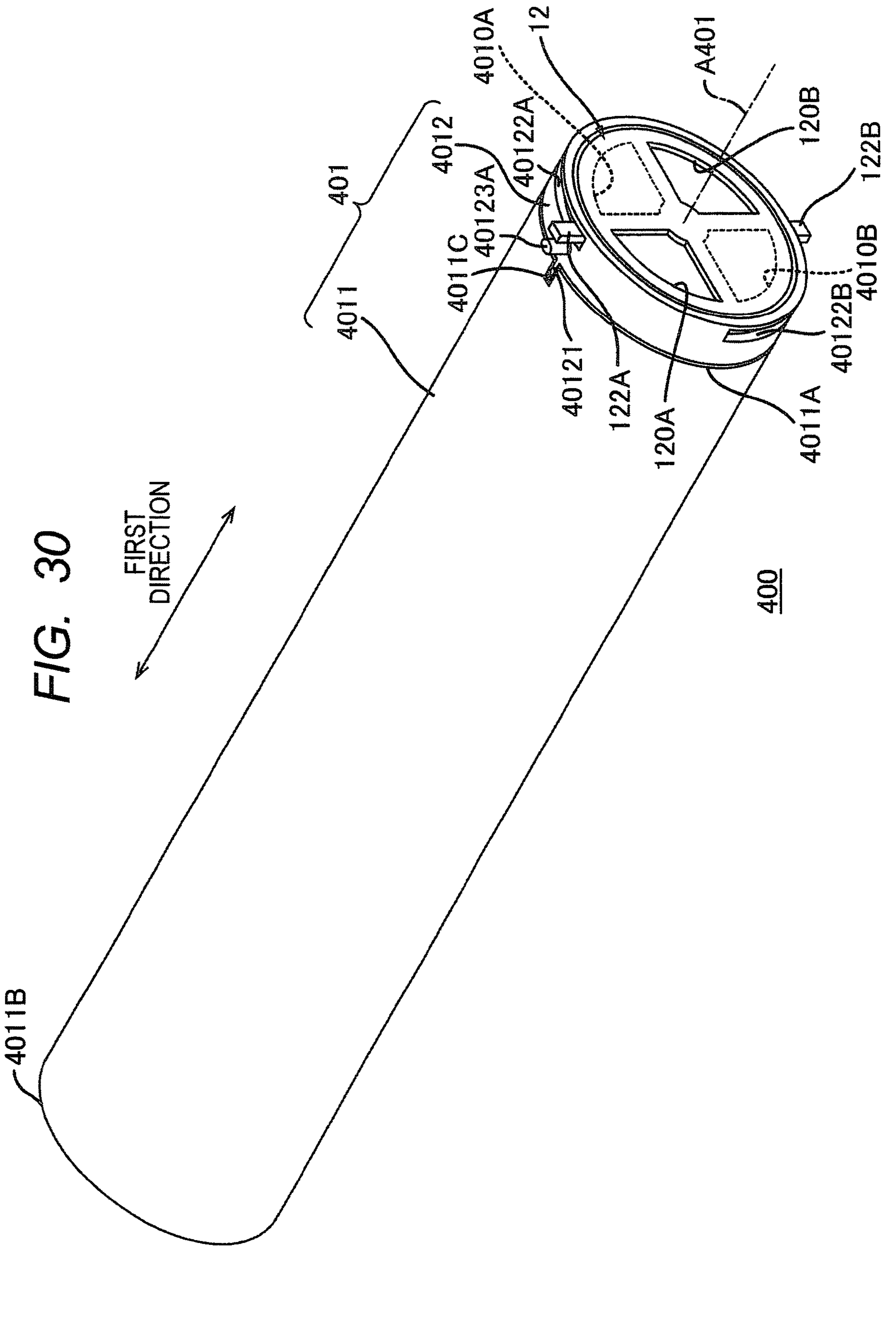
FIG. 30 is a perspective view of a toner container.

Specifically, as shown in FIG. 30, the toner container 400 has a cylindrical shape. The toner container 400 extends in the first direction. The toner container 400 includes a container main body 401 and the container shutter 12.

The container main body 401 stores toner. The container main body 401 includes a bottle 4011 and a connection member 4012.

The bottle 4011 is made of paper, for example. The bottle 4011 stores toner inside. The bottle 4011 extends in the first direction. The bottle 4011 has one end 4011A and an other end 4011B in the first direction. The one end 4011A has an opening. The other end 4011B is located away from the one end 4011A in the first direction. The bottle 4011 has a notch 4011C. The notch 4011C is located at the one end 4011A. The notch 4011C extends in the first direction.

The connection member 4012 is connected to the one end 4011A of the bottle 4011. The connection member 4012 closes the opening of the bottle 4011. The connection member 4012 extends in the first direction. The connection member 4012 has a cylindrical shape. The connection member 4012 is made of hard resin, for example. The connection member 4012 has a plurality of discharge ports 4010A, 4010B, a protrusion 40121, a plurality of through holes 40122A, 40122B, and a plurality of protrusions 40123A, 40123B (see FIG. 28). That is, the container main body 401 has the discharge ports 4010A and 4010B.

The discharge ports 4010A and 4010B communicate with the inner space of the bottle 4011. The discharge ports 4010A and 4010B discharge the toner inside the container main body 401. The discharge port 4010B is located away from the discharge port 4010A in the radial direction of the connection member 4012.

The protrusion 40121 fits into the notch 4011C of the bottle 4011. Thus, the connection member 4012 rotates about an axis A401 together with the bottle 4011. The axis A401 extends in the first direction.

The through holes 40122A and 40122B are located on the circumferential surface of connection member 4012. The through hole 40122B is located away from the through hole 40122A in the circumferential direction of the connection member 4012. Each of the through holes 40122A and 40122B extends in the circumferential direction of connection member 4012. The protrusion 122A of the container shutter 12 protrudes outside the connection member 4012 through the through hole 40122A. The protrusion 122B of the container shutter 12 protrudes outside the connection member 4012 through the through hole 40122B.

The protrusion 40123A is located on the circumferential surface of the connection member 4012. The protrusion 40123A extends from the circumferential surface of the connection member 4012. The protrusion 40123A extends in a radial direction of the connection member 4012. In a state where the container shutter 12 is located at the container shutter closed position, the protrusion 40123A is aligned with the protrusion 122A of the container shutter 12 in the first direction.

As shown in FIG. 28, the protrusion 40123B is located on the opposite side of the protrusion 40123A with respect to the axis A401 in the radial direction of the connection member 4012. The protrusion 40123B is located on the circumferential surface of the connection member 4012. The protrusion 40123B extends from the circumferential surface of the connection member 4012. The protrusion 40123B extends in the radial direction of the connection member 4012. In a state where the container shutter 12 is located at the container shutter closed position, the protrusion 40123B is aligned with the protrusion 122B (see FIG. 30) of the container shutter 12 in the first direction.

Figure 31:
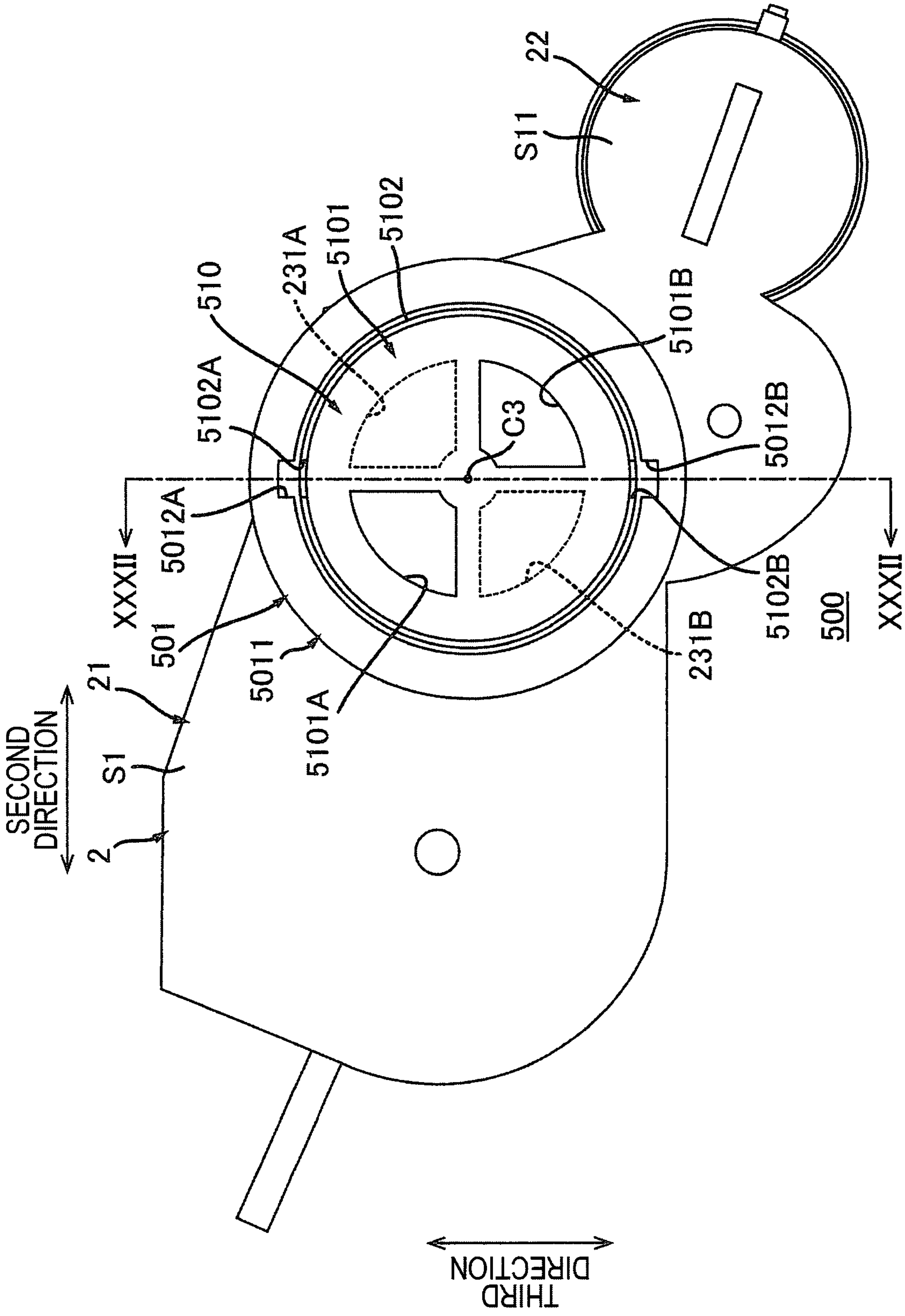
FIG. 31 is a side view of a toner cartridge.

In this modification, as shown in FIGS. 28 and 31, the reception portion 501 of the toner cartridge 500 does not have the lever 5. The reception portion 501 has a plurality of reception ports 231A and 231B and a frame 5011.

Figure 32:
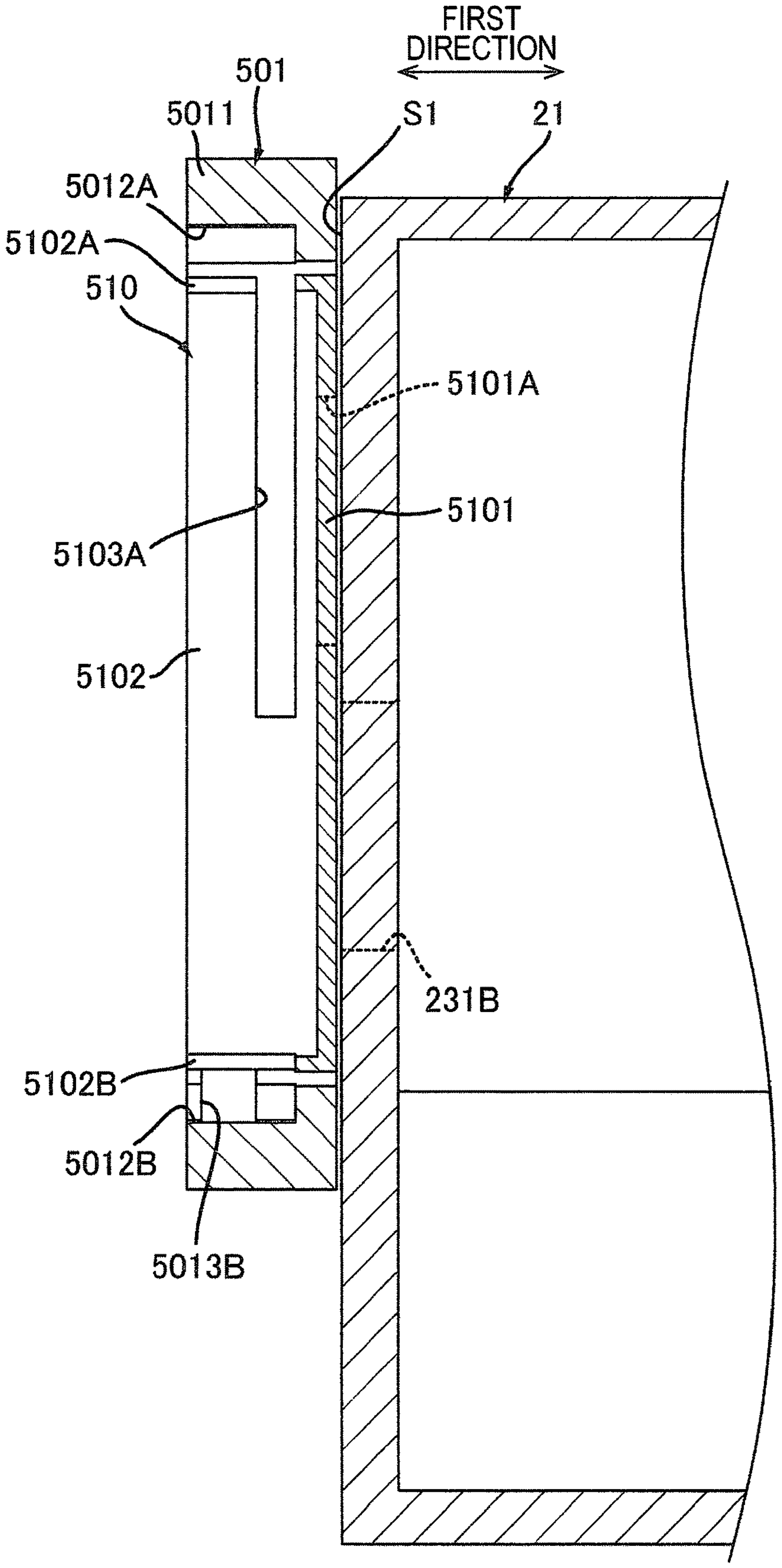
FIG. 32 is a cross-sectional view of the toner cartridge shown in FIG. 31, taken along a line XXXII-XXXII.

As shown in FIGS. 31 and 32, the frame 5011 supports the reception shutter 510. The frame 5011 protrudes from the end surface S1 of the first storage portion 21 at one end in the first direction. The frame 5011 extends in the first direction. The frame 5011 has a cylindrical shape. The frame

5011 surrounds the reception ports 231A and 231B (see FIG. 31). The frame 5011 has a plurality of grooves 5012A, 5012B and a plurality of grooves 5013A, 5013B (see FIG. 28).

The groove 5012A is located at one end of the frame 5011 in the third direction. The groove 5012A is located at the inner circumferential edge of the frame 5011. The groove 5012A is recessed outward from the inner circumferential edge of the frame 5011 in the third direction. The groove 5012A extends in the first direction (see FIG. 32).

The groove 5012B is located at the other end of the frame 5011 in the third direction. The groove 5012B is located on the opposite side of the groove 5012A with respect to a center C3 (see FIG. 31) of the reception portion 501 in the third direction. The groove 5012B is located at the inner circumferential edge of the frame 5011. The groove 5012B is recessed outward from the inner circumferential edge of the frame 5011 in the third direction. The groove 5012B extends in the first direction (see FIG. 32).

As shown in FIG. 28, the groove 5013A is located on the inner circumferential surface of the frame 5011. The groove 5013A extends in the circumferential direction of the frame 5011 from the middle of the groove 5012A.

As shown in FIGS. 28 and 32, the groove 5013B is located away from the groove 5013A on the inner circumferential surface of the frame 5011. The groove 5013B extends in the circumferential direction of the frame 5011 from the middle of the groove 5012B.

As shown in FIG. 31, the reception shutter 510 has a shutter main body 5101 and a rib 5102.

The shutter main body 5101 has a disc shape. The shutter main body 5101 has a plurality of openings 5101A and 5101B.

In a state where the reception shutter 510 is located at the reception shutter closed position (see FIG. 31), the opening 5101A is located away from the reception port 231A. As shown in FIG. 29, in a state where the reception shutter 510 is located at the reception shutter open position, at least part of the opening 5101A communicates with the reception port 231A.

As shown in FIG. 31, the opening 5101B is located away from the opening 5101A in the radial direction of the shutter main body 5101. The opening 5101B is located on the opposite side of the opening 5101A with respect to the center C3 in the radial direction of the shutter main body 5101. In a state where the reception shutter 510 is located at the reception shutter closed position, the opening 5101B is located away from the reception port 231B. As shown in FIG. 29, in a state where the reception shutter 510 is located at the reception shutter open position, at least part of the opening 5101B communicates with the reception port 231B.

As shown in FIG. 31, the rib 5102 is located on the edge of the shutter main body 5101. The rib 5102 protrudes from the shutter main body 5101 in the first direction. The rib 5102 extends in the circumferential direction of the shutter main body 5101. The rib 5102 has a plurality of grooves 5102A, 5102B and a plurality of grooves 5103A, 5103B (see FIG. 28).

As shown in FIGS. 31 and 32, the groove 5102A is recessed toward the shutter main body 5101 from one edge of the rib 5102 in the first direction. In a state where the reception shutter 510 is located at the reception shutter closed position, the groove 5102A communicates with the groove 5012A of the frame 5011.

The groove 5102B is located on the opposite side of the groove 5102A with respect to the center C3 in the radial direction of the shutter main body 5101. The groove 5102B is recessed toward the shutter main body 5101 from one edge of the rib 5102 in the first direction. In a state where the reception shutter 510 is located at the reception shutter closed position, the groove 5102B communicates with the groove 5012B of the frame 5011.

As shown in FIGS. 28 and 31, the groove 5103A extends from the middle of the groove 5102A in a direction opposite to the rotational direction of the reception shutter 510 from the reception shutter closed position to the reception shutter open position.

As shown in FIG. 28, the groove 5103B is located away from the groove 5103A in the direction of rotation of the reception shutter 510. The groove 5103B extends from the middle of the groove 5102B in the direction opposite to the rotation direction of the reception shutter 510 from the reception shutter closed position to the reception shutter open position.

Figure 33:
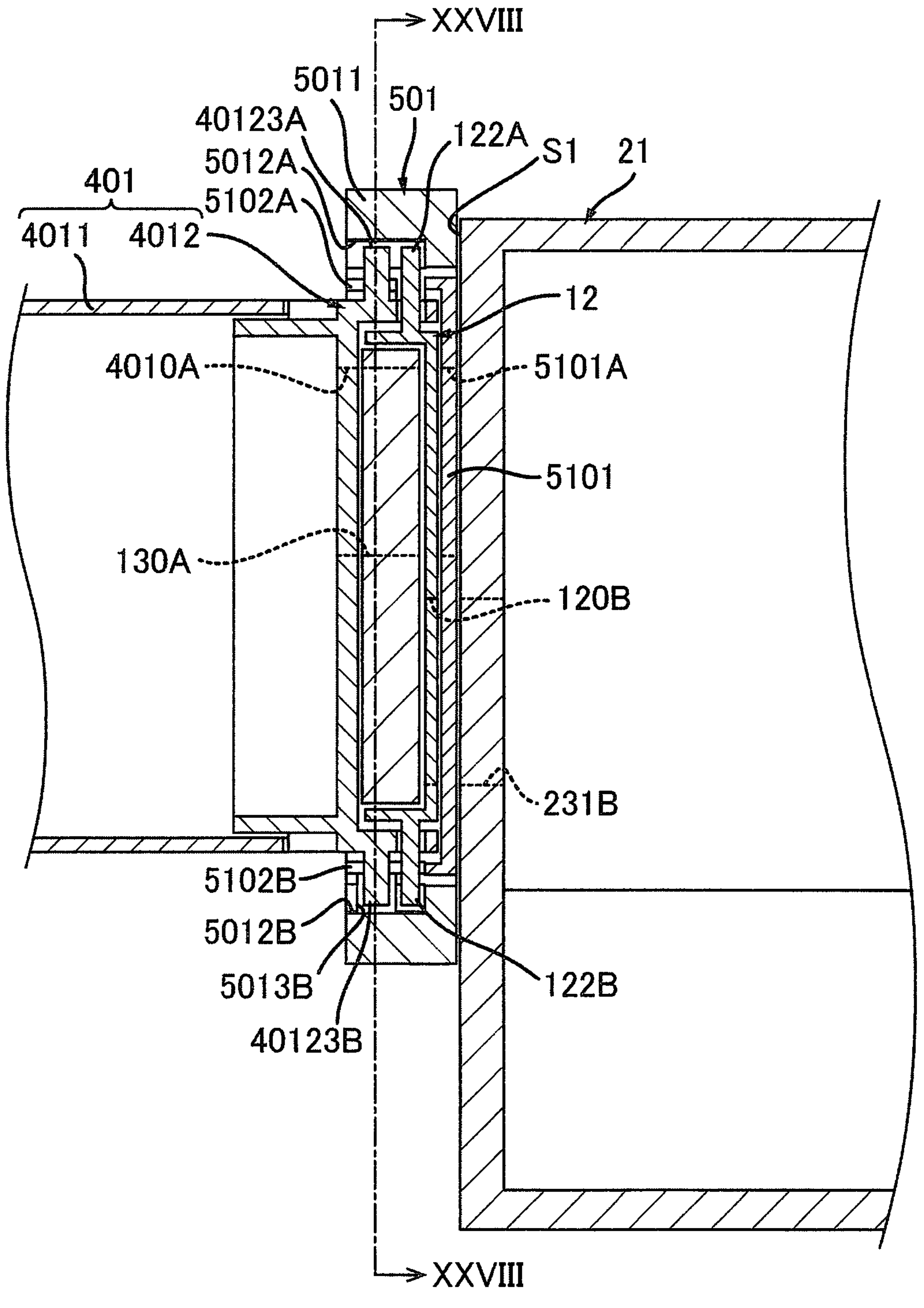
FIG. 33 is a cross-sectional view showing a state where the toner container shown in FIG. 30 is connected to a reception portion of the toner cartridge shown in FIG. 32.

As shown in FIG. 33, in a state where the toner container 400 is connected to the reception portion 501, the protrusion 122A of the container shutter 12 fits into the groove 5012A of the frame 5011, and the protrusion 122B of the container shutter 12 fits into the groove 5012B of the frame 5011. Thereby, the container shutter 12 is fixed to the frame 5011 of the reception portion 501.

Further, in a state where toner container 400 is connected to reception portion 501, the protrusion 40123A of the toner container 400 fits into the groove 5102A of the reception shutter 510, and the protrusion 40123B of toner container 400 fits into the groove 5102B of the reception shutter 510. Thus, the reception shutter 510 rotates together with the container main body 401.

When the user rotates the container main body 401 about the axis A401 in a state where the toner container 400 is connected to the reception portion 501, as shown in FIGS. 28 and 29, the reception shutter 510 rotates together with the container main body 401 from the reception shutter closed position toward the reception shutter open position in a state where the container shutter 12 is fixed to the frame 5011 of the reception portion 501.

At this time, the protrusion 122A of the container shutter 12 is received in the groove 5103A of the reception shutter 510 (see FIG. 32), and the protrusion 122B of the container shutter 12 is received in the groove 5103B of the reception shutter 510 (see FIG. 29). Thus, even in a state where the container shutter 12 is fixed to the frame 5011, the reception shutter 510 is rotated without hitting the protrusions 122A and 122B of the container shutter 12.

At this time, as shown in FIG. 29, the protrusion 40123A of the toner container 400 is received in the groove 5013A of the frame 5011, and the protrusion 40123B of the toner container 400 is received in the groove 5013B of the frame 5011. In this state, the reception ports 231A, 231B of the reception portion 501 and the discharge ports 4010A, 4010B of the container main body 401 communicate with each other, and toner is supplied from the toner container 400 to the toner housing 2.

(4) In the modifications (1) to (3), the same effects as those of the above-described embodiment are obtained.

What is claimed is:

1. A cartridge comprising:

a toner housing extending in a first direction, the toner housing being configured to store toner, the toner housing including:

a reception portion located at an end surface of the toner housing at one end in the first direction, the reception portion having a reception port for receiving toner into the toner housing; and a discharge port located between the one end of the toner housing and an other end of the toner housing in the first direction, the discharge port being located on a surface crossing the end surface, the discharge port being for discharging toner in the toner housing; and a reception shutter attached to the reception portion, the reception shutter being rotatable about an axis extending in the first direction between a reception shutter closed position at which the reception port is closed and a reception shutter open position at which the reception port is open.

2. The cartridge according to claim 1, wherein the reception portion is connectable to a toner container configured to store toner that is supplied to the toner housing; and wherein the reception port is configured to receive toner from the toner container in a state where the toner container is connected to the reception portion and the reception shutter is located at the reception shutter open position.

3. The cartridge according to claim 2, wherein the reception shutter is rotatable, together with the toner container, between the reception shutter closed position and the reception shutter open position in a state where the toner container is connected to the reception portion.

4. The cartridge according to claim 1, wherein the toner housing includes:

a first storage chamber located away from the discharge port; and a second storage chamber located between the first storage chamber and the discharge port;

wherein the reception port communicates with the first storage chamber; and wherein the discharge port communicates with the second storage chamber.

5. The cartridge according to claim 4, wherein a volume of the first storage chamber is larger than a volume of the second storage chamber.

6. The cartridge according to claim 1, further comprising a development roller, the development roller being configured to supply toner in the toner housing to a photosensitive drum, the development roller being rotatable about a development axis extending in the first direction.

7. The cartridge according to claim 1, further comprising a photosensitive drum rotatable about a drum axis extending in the first direction.

8. The cartridge according to claim 2, wherein the toner container is detachable from the cartridge in a state where the toner container is connected to the reception portion and the reception shutter is located at the reception shutter closed position; and wherein the toner container is undetachable from the cartridge in a state where the toner container is connected to the reception portion and the reception shutter is located at the reception shutter open position.

9. The cartridge according to claim 2, wherein the toner container includes:

a container main body configured to store toner, the container main body having a container discharge port configured to discharge toner in the container main body; and a container shutter configured to open and close the container discharge port of the container main body;

wherein the container shutter closes the container discharge port of the container main body in a state where the toner container is connected to the reception portion and the reception shutter is located at the reception shutter closed position; and wherein the container shutter opens the discharge port of the container main body in a state where the toner container is connected to the reception portion and the reception shutter is located at the reception shutter open position.

10. The cartridge according to claim 9, further comprising a lever rotatable between:

a first position at which the lever causes the reception shutter to be located at the reception shutter closed position; and a second position at which the lever causes the reception shutter to be located at the reception shutter open position;

wherein, in a state where the toner container is not connected to the reception portion, the lever and the reception shutter are rotatable separately; and wherein, in a state where the toner container is connected to the reception portion, a part of the container shutter engages with a part of the lever and a part of the reception shutter, and the container shutter, the lever, and the reception shutter are rotatable together.

11. The cartridge according to claim 10, wherein, in a state where the toner container is connected to the reception portion and the reception shutter is located at the reception shutter open position and the container shutter opens the container discharge port of the container main body, a part of the container shutter engages with a frame of the reception portion and the toner container is undetachable from the reception portion.

12. The cartridge according to claim 9, wherein, when the toner container is connected to the cartridge, the container shutter is fixed to the reception portion and the container main body is fixed to the reception shutter; and wherein, when the container main body is rotated relative to the reception portion in a state where the toner container is connected to the cartridge, the reception shutter is rotated, together with the container main body, from the reception shutter closed position to the reception shutter open position, and the reception port of the reception portion and the container discharge port of the container main body communicate with each other.

13. A cartridge comprising:

a toner housing extending in a first direction, the toner housing being configured to store toner, the toner housing including:

a reception portion located at an end surface of the toner housing at one end in the first direction, the reception portion having a reception port for receiving toner into the toner housing; and a discharge port located between the one end of the toner housing and an other end of the toner housing in the first direction, the discharge port being located on a surface crossing the end surface, the discharge port being for discharging toner in the toner housing;

a reception shutter attached to the reception portion, the reception shutter being movable between a reception shutter closed portion at which the reception port is closed and a reception shutter open position at which the reception port is open; and a lever movable between:

a first position at which the lever causes the reception shutter to be located at the reception shutter closed position; and a second position at which the lever causes the reception shutter to be located at the reception shutter open position.

14. The cartridge according to claim 13, wherein the reception portion is connectable to a toner container configured to store toner that is supplied to the toner housing; and wherein the reception port is configured to receive toner from the toner container in a state where the toner container is connected to the reception portion and the reception shutter is located at the reception shutter open position.

15. The cartridge according to claim 14, wherein the reception shutter is rotatable, together with the toner container, between the reception shutter closed position and the reception shutter open position in a state where the toner container is connected to the reception portion.

16. The cartridge according to claim 13, wherein the toner housing includes:

a first storage chamber located away from the discharge port; and a second storage chamber located between the first storage chamber and the discharge port;

wherein the reception port communicates with the first storage chamber; and wherein the discharge port communicates with the second storage chamber.

17. The cartridge according to claim 16, wherein a volume of the first storage chamber is larger than a volume of the second storage chamber.

18. The cartridge according to claim 13, further comprising a development roller, the development roller being configured to supply toner in the toner housing to a photosensitive drum, the development roller being rotatable about a development axis extending in the first direction.

19. The cartridge according to claim 13, further comprising a photosensitive drum rotatable about a drum axis extending in the first direction.

20. A method of supplying toner to a cartridge, the method comprising:

connecting, to a cartridge, a toner container storing toner to be supplied to a toner housing of the cartridge in a state where a reception shutter of the cartridge is located at a reception shutter closed position, the toner housing extending in a first direction, the toner housing including: a reception portion located at an end surface of the toner housing at one end in the first direction, the reception portion having a reception port for receiving toner into the toner housing; and a discharge port located between the one end of the toner housing and an other end of the toner housing in the first direction, the discharge port being located on a surface crossing the end surface, the discharge port being for discharging toner in the toner housing, the reception shutter being attached to the reception portion, the reception shutter being movable between the reception shutter closed position at which the reception port is closed and a reception shutter open position at which the reception port is open;

moving the reception shutter from the reception shutter closed position to the reception shutter open position in a state where the toner container is connected to the reception portion; and supplying toner in the toner container into the toner housing in a state where the toner container is connected to the reception portion and the reception shutter is located at the reception shutter open position and the toner container is located above the cartridge.

* * * * *